(12) United States Patent
Becker et al.

(10) Patent No.: US 12,283,020 B2
(45) Date of Patent: Apr. 22, 2025

(54) SYSTEMS, METHODS, AND USER INTERFACES FOR GENERATING A THREE-DIMENSIONAL VIRTUAL REPRESENTATION OF AN OBJECT

(71) Applicant: Apple Inc., Cupertino, CA (US)

(72) Inventors: Zachary Z. Becker, Kirkland, WA (US); Michelle Chua, Seattle, WA (US); Thorsten Gernoth, San Francisco, CA (US); Michael P. Johnson, Sunnyvale, CA (US); Allison W. Dryer, Tiburon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/317,893

(22) Filed: May 15, 2023

(65) Prior Publication Data

US 2023/0377259 A1 Nov. 23, 2023

Related U.S. Application Data

(60) Provisional application No. 63/364,878, filed on May 17, 2022.

(51) Int. Cl.
*G06T 17/00* (2006.01)
*G06F 3/0346* (2013.01)
(Continued)

(52) U.S. Cl.
CPC ............ *G06T 19/20* (2013.01); *G06F 3/0346* (2013.01); *G06T 3/40* (2013.01); *G06T 3/60* (2013.01);
(Continued)

(58) Field of Classification Search
CPC ........... G06T 17/00; G06T 2207/10028; G06T 2207/30244; G06T 19/006; G06T 7/55;
(Continued)

(56) References Cited

U.S. PATENT DOCUMENTS 5,015,188 A 5/1991 Pellosie et al.
5,809,267 A 9/1998 Moran et al.
(Continued)

FOREIGN PATENT DOCUMENTS

EP 3118722 A1 1/2017
GB 2540791 A 2/2017
(Continued)

OTHER PUBLICATIONS

Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
(Continued)

*Primary Examiner* — Dong Hui Liang
(74) *Attorney, Agent, or Firm* — Kubota & Basol LLP

(57) ABSTRACT

Generating a three-dimensional virtual representation of a three-dimensional physical object can be based on capturing or receiving a capture bundle or a set of images. In some examples, generating the virtual representation of the physical object can be facilitated by user interfaces for identifying a physical object and capturing a set of images of the physical object. Generating the virtual representation can include previewing or modifying a set of images. In some examples, generating the virtual representation of the physical object can include generating a first representation of the physical object (e.g., a point cloud) and/or generating a second three-dimensional virtual representation of the physical object (e.g., a mesh reconstruction). In some examples, a visual indication of the progress of the image capture process and/or the generation of the virtual representation of the three-dimensional object can be displayed, such as in a capture user interface.

30 Claims, 18 Drawing Sheets

(51) Int. Cl.
*G06T 3/40* (2006.01)
*G06T 3/60* (2006.01)
*G06T 13/20* (2011.01)
*G06T 15/20* (2011.01)
*G06T 19/20* (2011.01)
*H04N 5/265* (2006.01)
*H04N 23/60* (2023.01)
*H04N 23/63* (2023.01)

(52) U.S. Cl.
CPC .............. *G06T 13/20* (2013.01); *G06T 15/20* (2013.01); *G06T 17/00* (2013.01); *H04N 5/265* (2013.01); *H04N 23/632* (2023.01); *H04N 23/635* (2023.01); *H04N 23/64* (2023.01); *G06T 2200/08* (2013.01); *G06T 2200/24* (2013.01); *G06T 2210/12* (2013.01); *G06T 2210/56* (2013.01); *G06T 2219/2016* (2013.01)

(58) Field of Classification Search
CPC ...... G06F 3/011; G06F 3/04815; G06F 3/017; H04N 23/64; H04N 13/282; H04N 13/111; H04N 13/243; H04N 13/275
See application file for complete search history.

(56) References Cited

U.S. PATENT DOCUMENTS

| | | |
|---|---|---|
| 6,167,433 A | 12/2000 | Maples et al. |
| 6,295,069 B1 | 9/2001 | Shirur |
| 6,426,745 B1 | 7/2002 | Isaacs et al. |
| 6,750,873 B1 | 6/2004 | Bernardini et al. |
| 7,298,370 B1 | 11/2007 | Middler et al. |
| 9,183,672 B1 | 11/2015 | Hickman et al. |
| 9,294,757 B1* | 3/2016 | Lewis .................... G06F 3/038 |
| 9,298,334 B1 | 3/2016 | Zimmerman et al. |
| 9,383,189 B2 | 7/2016 | Bridges et al. |
| 9,396,580 B1 | 7/2016 | Nowrouzezahrai et al. |
| 9,519,371 B2 | 12/2016 | Nishida |
| 9,704,230 B2 | 7/2017 | Hofmann et al. |
| 9,779,512 B2 | 10/2017 | Tomlin et al. |
| 9,911,232 B2 | 3/2018 | Shapira et al. |
| 10,488,941 B2 | 11/2019 | Lam et al. |
| 10,642,368 B2 | 5/2020 | Chen |
| 10,664,043 B2 | 5/2020 | Ikuta et al. |
| 10,671,241 B1 | 6/2020 | Jia et al. |
| 10,691,216 B2 | 6/2020 | Geisner et al. |
| 10,762,716 B1 | 9/2020 | Paul et al. |
| 10,846,864 B2 | 11/2020 | Kim et al. |
| 11,138,798 B2 | 10/2021 | Paul et al. |
| 11,204,678 B1 | 12/2021 | Baker et al. |
| 11,249,556 B1 | 2/2022 | Schwarz et al. |
| 11,262,885 B1 | 3/2022 | Burckel |
| 11,340,756 B2 | 5/2022 | Faulkner et al. |
| 11,347,319 B2 | 5/2022 | Goel et al. |
| 11,409,363 B2 | 8/2022 | Chen et al. |
| 11,416,080 B2 | 8/2022 | Heo et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,762,473 B2 | 9/2023 | Cipoletta et al. |
| 11,768,544 B2 | 9/2023 | Schwarz et al. |
| 11,847,748 B2 | 12/2023 | Liu et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,928,263 B2 | 3/2024 | Jung et al. |
| 11,983,326 B2 | 5/2024 | Lacey |
| 11,989,965 B2 | 5/2024 | Tarighat Mehrabani |
| 12,032,803 B2 | 7/2024 | Pastrana Vicente et al. |
| 2002/0030692 A1 | 3/2002 | Griesert |
| 2005/0062738 A1 | 3/2005 | Handley et al. |
| 2005/0248299 A1 | 11/2005 | Chemel et al. |
| 2008/0310707 A1 | 12/2008 | Kansal et al. |
| 2010/0302245 A1 | 12/2010 | Best |
| 2010/0332196 A1 | 12/2010 | Fisker et al. |
| 2011/0142321 A1 | 6/2011 | Huffman |
| 2012/0113223 A1 | 5/2012 | Hilliges et al. |
| 2012/0170089 A1 | 7/2012 | Kim et al. |
| 2012/0249741 A1 | 10/2012 | Maciocci et al. |
| 2013/0222227 A1 | 8/2013 | Johansson et al. |
| 2013/0321462 A1 | 12/2013 | Salter et al. |
| 2013/0332890 A1 | 12/2013 | Ramic et al. |
| 2014/0040832 A1 | 2/2014 | Regelous |
| 2014/0078176 A1 | 3/2014 | Kim et al. |
| 2014/0104206 A1 | 4/2014 | Anderson |
| 2014/0129990 A1 | 5/2014 | Xin et al. |
| 2014/0333666 A1 | 11/2014 | Poulos et al. |
| 2014/0368620 A1* | 12/2014 | Li ......................... G06T 19/006 348/50 |
| 2015/0067580 A1 | 3/2015 | Um et al. |
| 2015/0121466 A1 | 4/2015 | Brands et al. |
| 2015/0123901 A1 | 5/2015 | Schwesinger et al. |
| 2015/0153833 A1 | 6/2015 | Pinault et al. |
| 2015/0317831 A1 | 11/2015 | Ebstyne et al. |
| 2015/0331576 A1 | 11/2015 | Piya et al. |
| 2016/0098093 A1 | 4/2016 | Cheon et al. |
| 2016/0189426 A1 | 6/2016 | Thomas et al. |
| 2016/0225164 A1 | 8/2016 | Tomlin et al. |
| 2016/0291922 A1 | 10/2016 | Montgomerie et al. |
| 2016/0373647 A1 | 12/2016 | Morate et al. |
| 2017/0032568 A1* | 2/2017 | Gharpure ................ G06T 13/20 |
| 2017/0052595 A1 | 2/2017 | Poulos et al. |
| 2017/0053383 A1 | 2/2017 | Heo |
| 2017/0178392 A1 | 6/2017 | Zuccarino et al. |
| 2017/0213388 A1 | 7/2017 | Margolis et al. |
| 2017/0221264 A1 | 8/2017 | Perry |
| 2017/0243352 A1 | 8/2017 | Kutliroff et al. |
| 2017/0251143 A1 | 8/2017 | Peruch et al. |
| 2017/0270715 A1 | 9/2017 | Lindsay et al. |
| 2017/0287215 A1 | 10/2017 | Lalonde et al. |
| 2017/0287225 A1 | 10/2017 | Powderly et al. |
| 2017/0351094 A1 | 12/2017 | Poulos et al. |
| 2018/0005433 A1 | 1/2018 | Kohler et al. |
| 2018/0088787 A1* | 3/2018 | Bereza .................. G06F 3/0488 |
| 2018/0103209 A1 | 4/2018 | Fischler et al. |
| 2018/0122138 A1 | 5/2018 | Piya et al. |
| 2018/0130255 A1* | 5/2018 | Hazeghi ............... H04N 13/243 |
| 2018/0143693 A1 | 5/2018 | Calabrese et al. |
| 2018/0173404 A1 | 6/2018 | Smith |
| 2018/0197341 A1 | 7/2018 | Loberg et al. |
| 2018/0330544 A1 | 11/2018 | Corso et al. |
| 2018/0348986 A1 | 12/2018 | Sawaki |
| 2019/0018479 A1 | 1/2019 | Minami |
| 2019/0018498 A1 | 1/2019 | West et al. |
| 2019/0050062 A1 | 2/2019 | Chen et al. |
| 2019/0130622 A1 | 5/2019 | Hoover et al. |
| 2019/0155495 A1 | 5/2019 | Klein et al. |
| 2019/0164340 A1 | 5/2019 | Pejic et al. |
| 2019/0228589 A1 | 7/2019 | Dascola et al. |
| 2019/0340832 A1 | 11/2019 | Srinivasan et al. |
| 2019/0349575 A1 | 11/2019 | Knepper et al. |
| 2019/0362557 A1 | 11/2019 | Lacey et al. |
| 2020/0005539 A1 | 1/2020 | Hwang et al. |
| 2020/0045249 A1* | 2/2020 | Francois ............... G06F 3/0484 |
| 2020/0048825 A1 | 2/2020 | Schultz et al. |
| 2020/0128227 A1 | 4/2020 | Chavez et al. |
| 2020/0135141 A1 | 4/2020 | Day et al. |
| 2020/0214682 A1 | 7/2020 | Zaslavsky et al. |
| 2020/0286299 A1 | 9/2020 | Wang et al. |
| 2020/0379626 A1 | 12/2020 | Guyomard et al. |
| 2021/0034163 A1 | 2/2021 | Goel et al. |
| 2021/0034319 A1 | 2/2021 | Wang et al. |
| 2021/0225043 A1 | 7/2021 | Tang et al. |
| 2021/0241483 A1 | 8/2021 | Dryer et al. |
| 2021/0279967 A1* | 9/2021 | Gernoth ................ G06T 19/006 |
| 2021/0295592 A1 | 9/2021 | Von Cramon |
| 2021/0374221 A1 | 12/2021 | Markhasin et al. |
| 2021/0383097 A1 | 12/2021 | Guerard et al. |

(56) References Cited

U.S. PATENT DOCUMENTS

| | | | |
|---|---|---|---|
| 2022/0083145 | A1 | 3/2022 | Matsunaga et al. |
| 2022/0084279 | A1 | 3/2022 | Lindmeier et al. |
| 2022/0121344 | A1 | 4/2022 | Pastrana Vicente et al. |
| 2022/0148257 | A1 | 5/2022 | Boubekeur et al. |
| 2022/0253136 | A1 | 8/2022 | Holder et al. |
| 2022/0317776 | A1 | 10/2022 | Sundstrom et al. |
| 2022/0326837 | A1 | 10/2022 | Dessero et al. |
| 2022/0335697 | A1 | 10/2022 | Harding et al. |
| 2022/0382385 | A1 | 12/2022 | Chen et al. |
| 2022/0397962 | A1 | 12/2022 | Goel et al. |
| 2022/0408164 | A1 | 12/2022 | Lee et al. |
| 2022/0413691 | A1 | 12/2022 | Becker et al. |
| 2022/0414975 | A1 | 12/2022 | Becker et al. |
| 2022/0415094 | A1 | 12/2022 | Kim et al. |
| 2023/0027040 | A1 | 1/2023 | Wang et al. |
| 2023/0030699 | A1 | 2/2023 | Zion et al. |
| 2023/0031832 | A1 | 2/2023 | Lipton et al. |
| 2023/0032771 | A1 | 2/2023 | Zion et al. |
| 2023/0076326 | A1 | 3/2023 | Xu et al. |
| 2023/0103161 | A1 | 3/2023 | Li et al. |
| 2023/0119162 | A1 | 4/2023 | Lipton et al. |
| 2023/0152935 | A1 | 5/2023 | Mckenzie et al. |
| 2023/0168745 | A1 | 6/2023 | Yoda |
| 2023/0290042 | A1 | 9/2023 | Casella et al. |
| 2023/0377299 | A1 | 11/2023 | Becker et al. |
| 2023/0377300 | A1 | 11/2023 | Becker et al. |
| 2024/0037886 | A1 | 2/2024 | Chiu et al. |
| 2024/0103636 | A1 | 3/2024 | Lindmeier et al. |
| 2024/0104875 | A1 | 3/2024 | Couche et al. |
| 2024/0104876 | A1 | 3/2024 | Couche et al. |
| 2024/0233097 | A1 | 7/2024 | Ngo et al. |

FOREIGN PATENT DOCUMENTS

| | | |
|---|---|---|
| KR | 20140097654 A | 8/2014 |
| KR | 20170027240 A | 3/2017 |
| KR | 20180102171 A | 9/2018 |
| KR | 20200110788 A | 9/2020 |
| KR | 20200135496 A | 12/2020 |
| WO | 2019/172678 A1 | 9/2019 |
| WO | 2019/213111 A1 | 11/2019 |
| WO | 2022/147146 A1 | 7/2022 |

OTHER PUBLICATIONS

Locher et al., "Mobile Phone and Cloud—a Dream Team for 3D Reconstruction", 2016 IEEE Winter Conference on Applications of Computer Vision (WACV), 2016, pp. 1-8.
Adding Environments, Available online at: https://manual.keyshot.com/manual/environments/adding-environments/, [retrieved on Jun. 9, 2023], 2 pages.
Area Light, Available online at: https://manual.keyshot.com/manual/materials/material-types/light-sources/area-light/, [retrieved on Jun. 9, 2023], 24 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/469,788, mailed on Nov. 16, 2023, 24 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
Light Manager, Available online at: https://manual.keyshot.com/manual/lighting/lighting-manager/, [retrieved on Jun. 9, 2023], 3 pages.
Non Final Office Action received for U.S. Appl. No. 17/814,455, mailed on Feb. 16, 2024, 24 pages.
Non-Final Office Action received for U.S. Appl. No. 17/469,788, mailed on Mar. 2, 2023, 22 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,462, mailed on Feb. 1, 2024, 30 pages.
Notice of Allowance received for U.S. Appl. No. 17/807,236, mailed on Feb. 5, 2024, 13 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Cas and Chary XR, "Oculus Go & Your Phone As 2nd Controller !! —An Inexpensive Way To Play PC VR Games", posted on Mar. 8, 2019, https://www.youtube.com/watch?v=i_iRVa0kemw, 2019, 4 pages.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Slambekova, Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Ex Parte Quayle Action received for U.S. Appl. No. 17/655,347, mailed on Jul. 8, 2024, 6 pages.
Notice of Allowance received for U.S. Appl. No. 17/807,226, mailed on Jul. 3, 2024, 9 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 18/473,180, mailed on Aug. 22, 2024, 13 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Notice of Allowance received for U.S. Appl. No. 17/469,788, mailed on Oct. 15, 2024, 7 pages.
Notice of Allowance received for U.S. Appl. No. 17/655,347, mailed on Oct. 9, 2024, 7 pages.
Notice of Allowance received for U.S. Appl. No. 17/814,455, mailed on Oct. 7, 2024, 10 pages.
Final Office Action received for U.S. Appl. No. 17/814,462, mailed on Nov. 1, 2024, 44 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
International Search Report received for PCT Patent Application No. PCT/US2023/074955, mailed on Feb. 1, 2024, 6 pages.
Non-Final Office Action received for U.S. Appl. No. 17/469,788, mailed on Mar. 21, 2024, 24 pages.
Non-Final Office Action received for U.S. Appl. No. 17/905,483, mailed on Mar. 27, 2024, 16 pages.
Reality Scan, Unreal Engine [online], [retrieved on Jun. 14, 2024]. Retrieved from the Internet: <URL: https://www.unrealengine.com/en-US/realityscan>, 11 pages.
RealityScan Available Now | Capture the World and Create Your Own, YouTube [online]. YouTube, Dec. 1, 2022 [retrieved on Jun. 14, 2024]. Retrieved from the Internet: <URL: https://www.youtube.com/watch? v=fXLOMOWWBJQ>, 2 pages.
Notice of Allowance received for U.S. Appl. No. 18/473,180, mailed on Jan. 2, 2025, 12 pages.
Final Office Action received for U.S. Appl. No. 17/905,483, mailed on Jan. 8, 2025, 19 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.

(56) References Cited

OTHER PUBLICATIONS

Curious Blocks Alternatives 12, progsoft [online]. 2024 [retrieved on Apr. 25, 2024]. Retrieved from the Internet: <URL: https://progsoft.net/en/software/curious-blocks>, 7 pages.

Voxelization with ARKit4 and LiDAR, Kitasenju Design [online]. X, Jul. 13, 2020 [retrieved on Apr. 25, 2024]. Retrieved from the Internet: <URL: https://twitter.com/kitasenjudesign/status/1282665402812608513>, 1 page.

MagicaVoxel 0.99.5 Review, YouTube [online]. Jun. 6, 2020 [retrieved on Apr. 25, 2024]. Retrieved from the Internet: <URL: https://www.youtube.com/watch?v=WPPFnHQWwFk>, 2 pages.

Open Source Voxel Editor for Windows, Mac, Linux, iOS, and Android, GOXEL [online]. 2019 [retrieved on Apr. 25, 2024]. Retrieved from the Internet: <URL: https://goxel.xyz/>, 3 pages.

Revopoint POP 2: Handheld 3D Scanner, REVOPOINT [online]. 2022 [retrieved on Apr. 25, 2024]. Retrieved from the Internet: <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, 16 pages.

ShareVOX—Create Voxel Art Together in AR | with Google, PHORIA [online]. 2018 [retrieved on Apr. 25, 2024]. Retrieved from the Internet: <URL: https://www.phoria.com.au/projects/sharevox/>, 2 pages.

VoxEdit Beta Tutorial—Introduction And How To Animate Voxel Creations, YouTube [online]. Jan. 15, 2021 [retrieved on Apr. 25, 2024]. Retrieved from the Internet: <URL: https://www.youtube.com/watch?v=fqcArJWtyqM>, 2 pages.

Voxel World Lens, Snapchat [online]. [retrieved on Jan. 9, 2025]. Retrieved from the Internet: <URL: https://www.snapchat.com/lens/689751dd6a7d446280d903d15d79f104?locale=en-US>, 2 pages.

Rossiev, Denis. "Voxelize: making a real-time AR voxel scanner with export on Snapchat", Denis Rossiev [online]. Jan. 31, 2023 [retrieved on Apr. 25, 2024]. Retrieved from the Internet: <URL: https://www.rossiev.pro/voxelize/>, 16 pages.

Qi, et al. "PointNet++: Deep Hierarchical Feature Learning on Point Sets in a Metric Space", Stanford University, Jun. 7, 2017. Retrieved from the Internet: <URL: https://arxiv.org/abs/1706.02413>, 14 pages.

Strand, Robin. "Surface skeletons in grids with non-cubic voxels", Proceedings of the 17th International Conference on Pattern Recognition, 2004, vol. 1, pp. 548-551. Retrieved from the Internet: <URL: https://www.researchgate.net/publication/4090277_Surface_skeletons_in_grids_with_non-cubic_voxels> <DOI: 10.1109/ICPR.2004.1334195>, 5 pages.

Notice of Allowance received for U.S. Appl. No. 17/812,965, mailed on Nov. 15, 2024, 6 pages.

\* cited by examiner

SYSTEMS, METHODS, AND USER INTERFACES FOR GENERATING A THREE-DIMENSIONAL VIRTUAL REPRESENTATION OF AN OBJECT

CROSS-REFERENCE TO RELATED APPLICATIONS

This application claims the benefit of U.S. Provisional Application No. 63/364,878, filed May 17, 2022, the content of which is incorporated herein by reference in its entirety for all purposes.

FIELD OF THE DISCLOSURE

This relates generally to systems, methods, and user interfaces for capturing and/or receiving images of a physical object and generating a three-dimensional virtual representation of the physical object based on the images.

SUMMARY OF THE DISCLOSURE

This relates generally to systems, methods, and user interfaces for capturing and/or receiving images of a physical object and generating a three-dimensional virtual representation of the physical object based on the images. In some examples, generating a three-dimensional representation of a three-dimensional object can be based on capturing a set of images of the physical object (e.g., using user interfaces for identifying a target physical object and capturing images of the object) and/or on receiving a capture bundle or a set of images of the physical object (e.g., using a user interface for importing a capture bundle or a set of images). In some embodiments, generating the virtual representation of the physical object includes generating one or more point cloud representations of the physical object and/or one or more mesh representations of the object.

DETAILED DESCRIPTION

Figure 1:
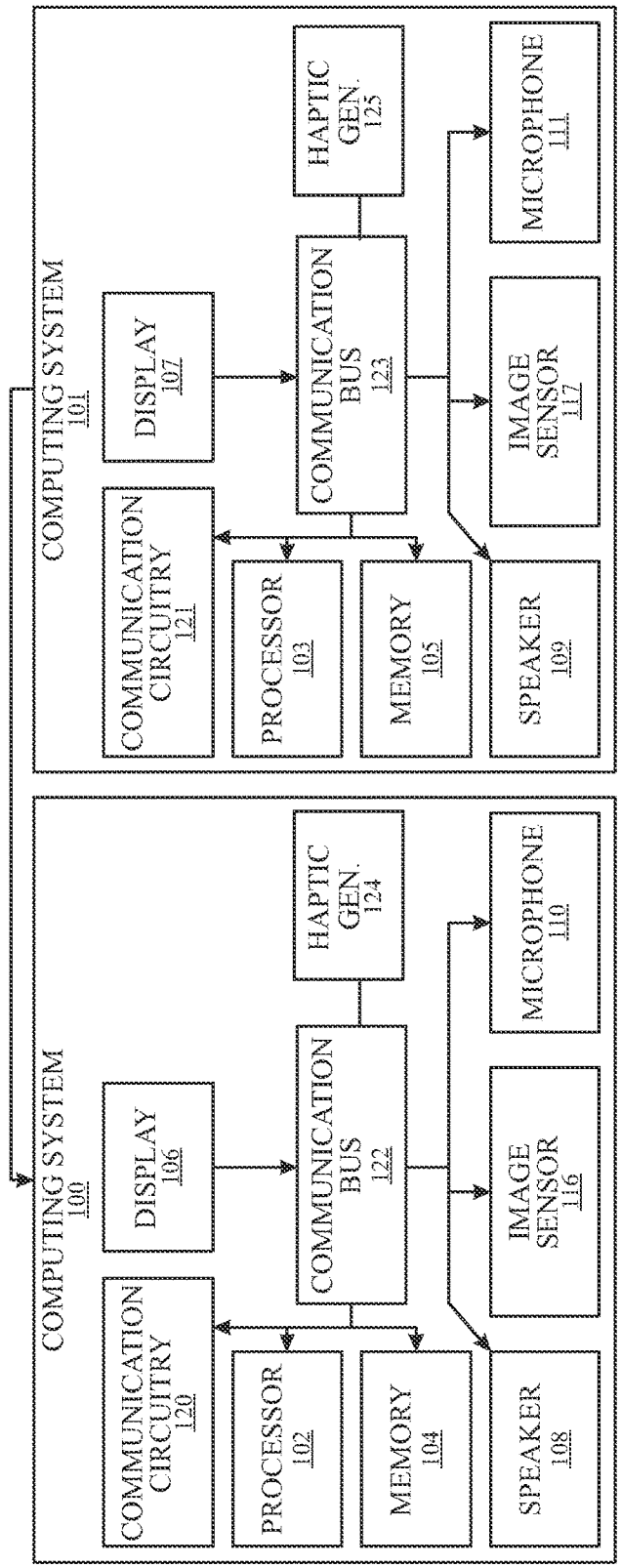
FIG. 1 illustrates an example system that can generate a three-dimensional representation of a three-dimensional object according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to systems, methods, and user interfaces for generating a three-dimensional virtual representation of a three-dimensional physical object. In some examples, generating the virtual representation of the physical object can be based on capturing a set of images (e.g., using user interfaces for identifying a target physical object and capturing images of the object), receiving a capture bundle, and/or receiving a set of images (e.g., using a user interface for importing a capture bundle or a set of images). In some examples, generating the three-dimensional representation of the three-dimensional object can include previewing and/or modifying a set of images (e.g., using a preview user interface). In some examples, generating the three-dimensional representation of the three-dimensional object can include generating a first representation of the three-dimensional object (e.g., a point cloud). In some examples, generating the three-dimensional representation of the three-dimensional object can include generating a second three-dimensional representation of the three-dimensional object (e.g., a three-dimensional mesh reconstruction of the three-dimensional object).

In some examples, generating the first representation of the three-dimensional object and generating the second representation of the three-dimensional object can include display of progress using progress bars and/or using an indication of progress associated with a plurality of points derived from the images and/or using the point cloud. For example, in some examples, while displaying the first representation of a three-dimensional object, a first visual indication of progress of the generation of the second representation of the three-dimensional object can be displayed (e.g., the first visual indication of the progress including changing an appearance of the first representation corresponding to the progress). In some examples, while displaying a plurality of points (e.g., associated with the set of images), a second visual indication of progress of the generation of the point cloud (different from the first visualization of progress) can be displayed (e.g., the second visual indication of the progress including changing an appearance of the plurality of points corresponding to the progress).

In some examples, generating the three-dimensional representation of the three-dimensional object includes displaying a first object capture user interface for identifying a target physical object, including displaying, using an electronic device, a virtual reticle overlaid on a live view of the physical object to assist the user in centering the field of view of the electronic device on the physical object. In some examples, in response to determining that a physical object is centered within the virtual reticle (and optionally, in response to detecting a selection of an initiation affordance), the electronic device displays an animation that transforms the virtual reticle into a three-dimensional virtual bounding shape around the physical object (e.g., a bounding box).

In some examples, generating the three-dimensional representation of the physical object includes displaying a second object capture user interface for providing feedback to the user during the image capture process (e.g., during a time duration over which the electronic device captures images of the physical object, automatically and/or in response to user inputs). The second object capture user interface optionally includes various user interface elements that indicate, to the user, which perspectives of the physical object have been captured by the electronic device and which perspectives still need to be captured. In some examples, the second object capture user interface includes a preview of a virtual representation of the physical object as it is constructed by the electronic device.

FIG. 1 illustrates an example block diagram of a system that can generate a three-dimensional representation of a three-dimensional object according to examples of the disclosure. In some examples, the system includes a first computing system 100 and a second computing system 101. In some examples, the second computing system 101 can be used to capture images or receive or import a capture bundle of a real-world three-dimensional object, and the first computing system 100 can be used to generate a three-dimensional representation of the three-dimensional object using the capture bundle or images. In some examples, the second computing system 101 can have relatively less processing power than the first computing system. In some examples, first computing system 100 comprises a desktop computer, a laptop computer, a tablet computing device, a mobile device, or a wearable device (e.g., a smart watch or a head-mounted device). In some examples, second computing system 101 comprises a desktop computer, a laptop computer, a tablet computing device, a mobile device, or a wearable device. In some examples, first computing system 100 is a desktop/laptop computer and second computing system 101 is a tablet computing device, a mobile device, or a wearable device. In some examples, the system can include the first computing system 100, which can both capture images or receive or import a capture bundle and generate a three-dimensional representation of the three-dimensional object using the capture bundle or images. In some examples, the system can include the first computing system 100, which can generate a three-dimensional representation of the three-dimensional object using the capture bundle or images stored on or received by computing system 100 from another computing system or other electronic device.

In some examples, as illustrated in FIG. 1, computing system 100 includes processor 102, memory 104, display 106, speaker 108, microphone 110, one or more image sensors 116, communication circuitry 120, and optionally, haptic generator 124 (e.g., circuitry and/or other hardware capable of generating a haptic alert), which optionally communicate over communication bus 122 of computing system 100. In some examples, image sensors 116 include user-facing eye-tracking sensors for detecting and/or monitoring a direction of a user's gaze (e.g., in a head-mounted device) and/or hand-tracking sensors for detecting user gestures. In some examples, as illustrated in FIG. 1, computing system 101 includes processor 103, memory 105, display 107, speaker 109, microphone 111, one or more image sensors 117, and communication circuitry 121, and optionally, haptic generator 125 (e.g., circuitry and/or other hardware capable of generating a haptic alert), which optionally communicate over communication bus 123 of computing system 101. In some examples, the image sensors 117 include user-facing eye-tracking sensors for detecting and/or monitoring a direction of a user's gaze (e.g., in a head-mounted device) and/or hand-tracking sensors for detecting user gestures. In some examples, computing system 100 and computing system 101 can include more than one processor, more than one memory, more than one display, more than one speaker, more than one microphone, more than one image sensor, and/or optionally communicate over more than one communication bus. In some examples, computing system 100 and/or computing system 101 can omit one or more of the components described herein (e.g., the computing system 100 may not include a camera, or computing system 101 may not include a speaker or microphone, etc.). Although FIG. 1 illustrates one example computing system, it is understood that, in some examples, multiple instances of computing system 100 and computing system 101 (or variations on computing system 100 and/or computing system 101) can be used by multiple users, and the different instances of the computing system can be in communication (e.g., via communication circuitry 120 and/or communication circuitry 121).

Processor(s) 102 and/or 103 can be configured to perform the processes described herein. Processor(s) 102 and 103 can include one or more general processors, one or more graphics processors, and/or one or more digital signal processors. In some examples, memory 104 and 105 are non-transitory computer-readable storage media (e.g., flash memory, random access memory, or other volatile or non-volatile memory or storage) that stores computer-readable instructions (e.g., programs) configured to be executed by processor(s) 102 and/or 103 to perform the processes described herein. In some examples, memory 104 and/or 105 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages, such as magnetic disks, optical discs based on CD, DVD, or Blu-ray technologies, as well as persistent solid-state memory such as flash, solid-state drives, and the like.

Computing system 100 and 101 can also include displays 106 and 107, respectively (often referred to herein as a display generation component(s)). In some examples, displays 106 and 107 can include a single display (e.g., a liquid-crystal display (LCD), organic light-emitting diode (OLED), or other types of display). In some examples, displays 106 and 107 include multiple displays. In some examples, displays 106 and 107 can include a display with touch-sensing capability (e.g., a touch screen) or a projector. In some examples, computing system 100 and/or computing system 101 includes microphones 110 and/or 111 or other suitable audio sensors. Computing system 100 and/or computing system 101 uses microphones 110 and/or 111 to detect sound from the user and/or the real-world environment of the user. In some examples, microphones 110 and/or 111 include an array of microphones (a plurality of microphones) that optionally operate jointly, such as to identify ambient sound levels.

Computing system 100 and/or computing system 101 optionally includes image sensors 116 and/or 117, which optionally include one or more visible light image sensor, such as charged coupled device (CCD) sensors and/or complementary metal-oxide-semiconductor (CMOS) sensors operable to obtain images of physical objects in the real-world environment. In some examples, image sensors 116 and/or 117 also include one or more infrared sensors, such as a passive or active infrared sensor, configured to detect infrared light in the real-world environment. For example, an active infrared sensor includes an emitter configured to emit infrared light into the real-world environment. Image sensors 116 and/or 117 also optionally include one or more cameras configured to capture movement of physical objects in the real-world environment. Image sensors 116 and/or 117 also optionally include one or more depth sensors configured to detect the distance of physical objects from the computing system. In some examples, information from one or more depth sensors allows the device to identify objects in the real-world environment and differentiate objects in the real-world environment from other objects in the real-world environment. In some examples, one or more depth sensors allow the computing system to determine the texture and/or topography of objects in the real-world environment. In some examples, computing system 100 and/or computing system 101 uses CCD sensors, infrared sensors, and depth sensors in combination to detect the physical environment around the computing system. In some examples, image sensor 116 and/or 117 include multiple image sensors working jointly and configured to capture different information of physical objects in the real-world environment. In some examples, computing system 100 and/or computing system 101 uses image sensors 116 and/or 117 to detect the position and orientation of one or more objects in a real-world (physical) environment. For example, computing system 100 and/or computing system 101 can use image sensors 116 and/or 117 to track the position and orientation of one or more stationary physical objects in the real-world environment as the computing system moves relative to the physical objects.

Communication circuitry 120 and/or 121 optionally includes circuitry for communicating with electronic devices, networks (e.g., the Internet), intranets, a wired network and/or a wireless network, cellular networks, and wireless local area networks (LANs), etc. Communication circuitry 120 and/or 121 optionally includes circuitry for communicating using near-field communication (NFC) and/or short-range communication (e.g., Bluetooth®).

It is understood that computing system 100 and/or computing system 101 are not limited to the components and configuration of FIG. 1, but can include fewer, other, or additional components in multiple configurations.

Figure 2:
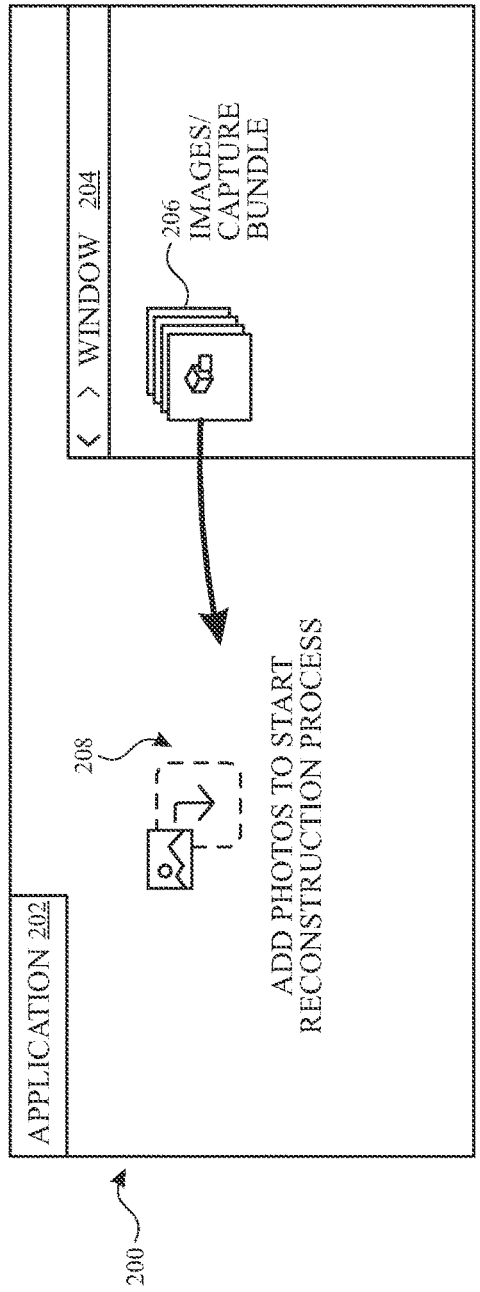
FIG. 2 illustrates an example user interface for importing images to generate a three-dimensional representation of a three-dimensional object according to examples of the disclosure.

FIG. 2 illustrates an example user interface for importing images (or a capture bundle) to generate a three-dimensional representation of a three-dimensional object according to examples of the disclosure. In some examples, computing system 200 corresponds to computing system 100. In some examples, as illustrated in FIG. 2, computing system 200 includes a display configurable to display one or more user interfaces. In some examples, the user interface can be included in an application 202 for generating three-dimensional virtual representations of physical objects. For example, such user interfaces optionally include user interfaces for identifying a physical object(s) for capture, capturing images of the physical object(s), and/or importing images of the physical object(s). In some examples, the application 202 can include a window for importing images or a capture bundle. For example, FIG. 2 illustrates a user interface element with a graphical representation 208 of an instruction and/or a text instruction to drag photos or a capture bundle and drop the photos or capture bundle in the window of application 202. As shown in FIG. 2, the graphical representation can include a representation of a photo and a representation of an image repository. Additionally, in some examples, the user interface can include a window 204 representing a source location of a plurality of images or capture bundles (e.g., optionally captured by computing system 101). For example, window 204 in FIG. 2 is shown to include images or capture bundle 206 (e.g., a graphical representation of a stack of images or an object capture bundle). In some examples, window 204 can be another location within computing system 200. In some examples, window 204 can be a part of application 202. In some examples, the graphical representation 208 can be a user selectable button. In some examples, graphical representation 208 can be selectable by a user to launch window 204 to enable a user to access or navigate to source images or capture bundles. In some examples, window 204 can represent a hierarchical representation of folders on the computing system. In some examples, window 204 can collect images or capture bundles from multiple folders for ease of access. In some examples, the user can import one or more images from another location on computing system 200 or from a location on another computing system in communication with computing system 200 (e.g., computing system 101). In some examples, dragging and dropping or other suitable inputs/gestures can be used to move images or capture bundle 206 from window 204 into application 202 or onto (or within a threshold distance of) graphical representation 208 within application 202.

Figure 3:
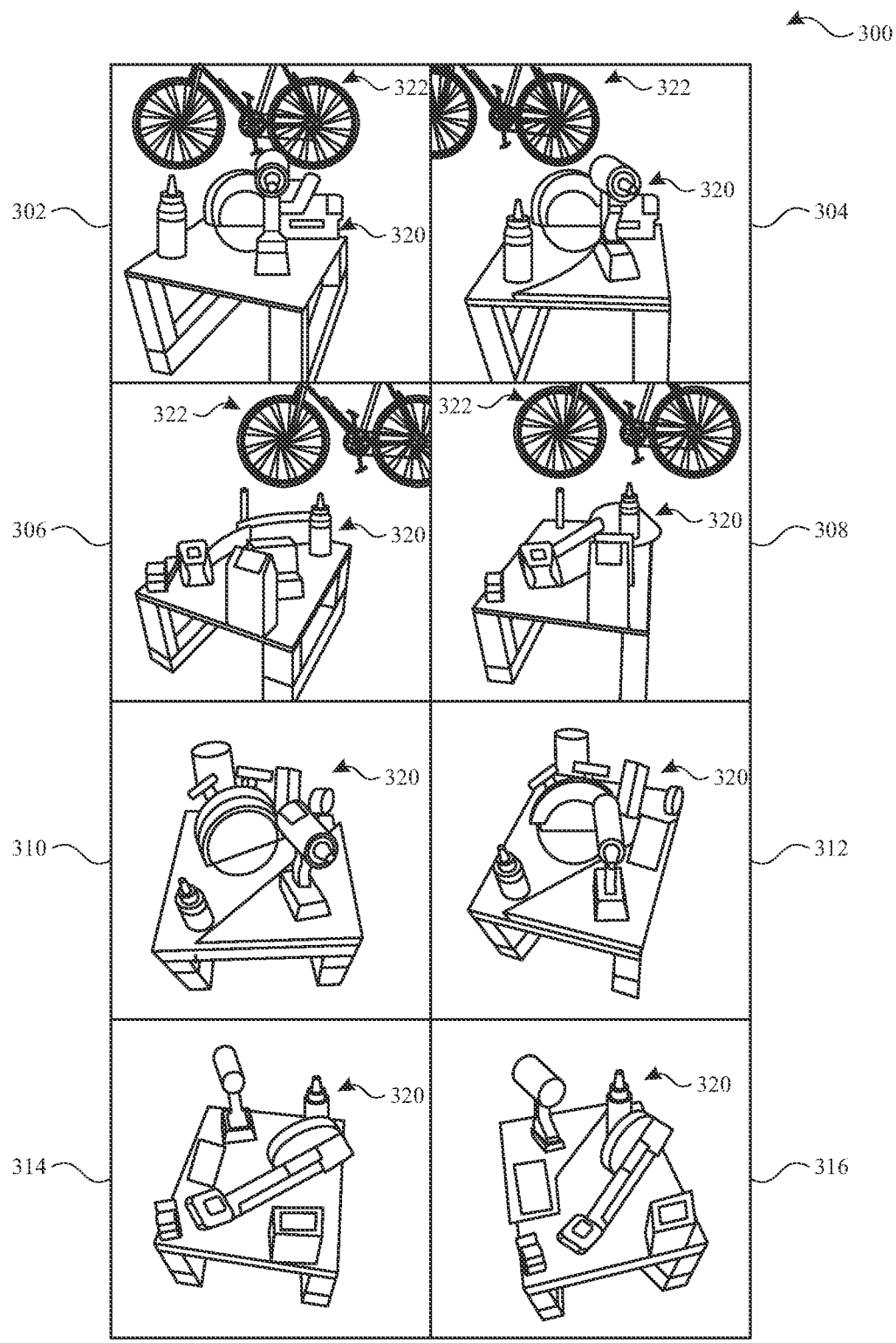
FIG. 3 illustrates an example preview of images according to examples of the disclosure.

In some examples, images or capture bundle 206 represents a group of images captured by an image sensor (e.g., raw images). The group of images can capture representations of a three-dimensional object from various directions/orientations/perspectives. For example, FIG. 3 illustrates different views of a workbench with tools on its surface, referred to herein as a tool table. In some examples, by including images that include various directions, orientations, and/or varying perspectives/views of a three-dimensional object, computing device 200 can be enabled to generate an accurate three-dimensional representation of the three-dimensional object that can be used to generate graphical representations to display to a user on a computing device or display device. In some examples, images or capture bundle 206 represents a capture bundle that includes information derived from one or more images (and optionally includes the one or more images themselves). The additional information in the capture bundle can be used to aid in the generation of the three-dimensional object. In some examples, the bundle includes depth information, pose information (e.g., orientation of one or more objects), gravity information (e.g., information of orientation relative to the gravitational force), color information, and/or object scale information. In some examples, the capture bundle includes a point cloud representation of one or more objects. In some examples, the additional information in a capture bundle helps resolve featureless surfaces such as flat white surfaces that can be more difficult to accurately reconstruct from images. In some examples, a capture bundle may also include a defined boundary box (e.g., generated on second computing system 101). As described herein, in some examples, the boundary box in the capture bundle can be adjusted on computing device 200 (first computing device 100) or can be added automatically or by a user, as discussed herein.

As described herein, the process of generating a three-dimensional representation of a three-dimensional object (e.g., a reconstruction process) may be different depending on whether a user begins with images or a capture bundle. In some examples, when beginning the reconstruction process with images, a preview user interface including the images can be displayed. FIG. 3 illustrates an example preview of images, which may be displayed on a display of the computing system (e.g., computing system 100, 200) according to examples of the disclosure. In some examples, as illustrated in FIG. 3, preview user interface 300 includes the one or more images to be used by (e.g. selected by or displayed for) the user of computing system 200. For example, and as illustrated in FIG. 3, preview user interface 300 displays image 302, image 304, image 306, image 308, image 310, image 312, image 314, and image 316. Each of images 302-316 includes a portion of the example three-dimensional object 320 (e.g., tool table). Although FIG. 3 illustrates images 302-316, it is understood that, in some examples, a greater or lesser number of images can be imported by the user to be used in the generation of the three-dimensional representation (e.g., a three-dimensional model reconstruction).

In some examples, the images include one or more additional objects from the capture environment that are not part of the three-dimensional object of interest. For instance, image 302, image 304, image 306, and image 308, each includes three-dimensional object 320 (e.g., tool table) but also includes a second three-dimensional object 322 (e.g., bicycle) different than the three-dimensional object 320. Although not shown in FIG. 3, the images may also capture other objects or aspects of the environment (e.g., floors, walls, trees, doors, sky, mountains, etc.). As described herein, in some examples, the other objects or aspects of the environment may be excluded from the reconstruction process using a bounding box. In some examples, the computing system (e.g., computing system 200) can be configured to determine which object(s) to focus on for the generation of the three-dimensional model or which object(s) to exclude from the generation of the three-dimensional model. In some examples, the user of computing system 200 can select the object(s) of interest or object(s) to exclude within user interface 300. In some examples, machine learning or artificial intelligence can be implemented (e.g., as part of the processing circuitry of the computing system) to analyze the images to identify objects or regions to exclude or to identify objects or regions to include for model reconstruction. For example, computing system 200 may be able to determine that second three-dimensional object 322 is present in images 302-308, but not present in images 310-316, and thus, second three-dimensional object 322 is likely not the object of the reconstruction process. It is understood that this determination may be made in various ways different than the examples above. In some examples, user interface 300 can include a user interface element (not shown) to enable or disable the feature of determining object(s) or region(s) of interest or of exclusion (e.g., a toggle button or menu item). When the feature is disabled, the reconstruction process may rely on the bounding box or other means of editing the scope of the three-dimensional object to be generated. When the feature is enabled, the reconstruction process may use an image mask to focus on the object of interest and/or exclude objects that are not of interest for the reconstruction process.

In some examples, in the preview user interface 300 one or more of the images could be selected or deselected to be added or excluded in the set of images used for the reconstruction process. In some examples, the computing system can recommend images to include in or exclude from the reconstruction process. For example, duplicate or similar views can be excluded to reduce processing burden whereas unique views may be included. As another example, images satisfying quality characteristics (e.g., good focus, contrast, brightness, etc.) can be included and those failing to satisfy quality characteristics (e.g., poor focus, contrast, brightness, etc.) can be excluded. In some examples, the preview user interface 300 can provide a user interface for adjusting characteristics of one or more of the images manually or automatically. For example, the color and/or lighting of the photo(s) can be adjusted or normalized. In some examples, the system may automatically determine which images to use and apply normalizing adjustments without requiring user input in the preview user interface. In some examples, preview user interface 300 may emphasize the appearance of or otherwise identify images to exclude and/or to modify (or include) in the reconstruction process. For example, the images to exclude and/or to modify may be greyed out or faded or overlaid with an icon or a badge indicating caution. In some examples, selecting the icon or badge can provide options to exclude, modify (e.g., adjust brightness, color, etc.), or delete the image. In response to the selections/deselections, the set of images and/or the characteristics of the images to be used for generation of the three-dimensional model can be updated.

Although the image preview is described primarily in the context of a reconstruction process relying on an import of images, it is understood that, in some examples, this preview may optionally be displayed in the context of a reconstruction process relying on an import of a capture bundle when the capture bundle includes images.

Figure 4:
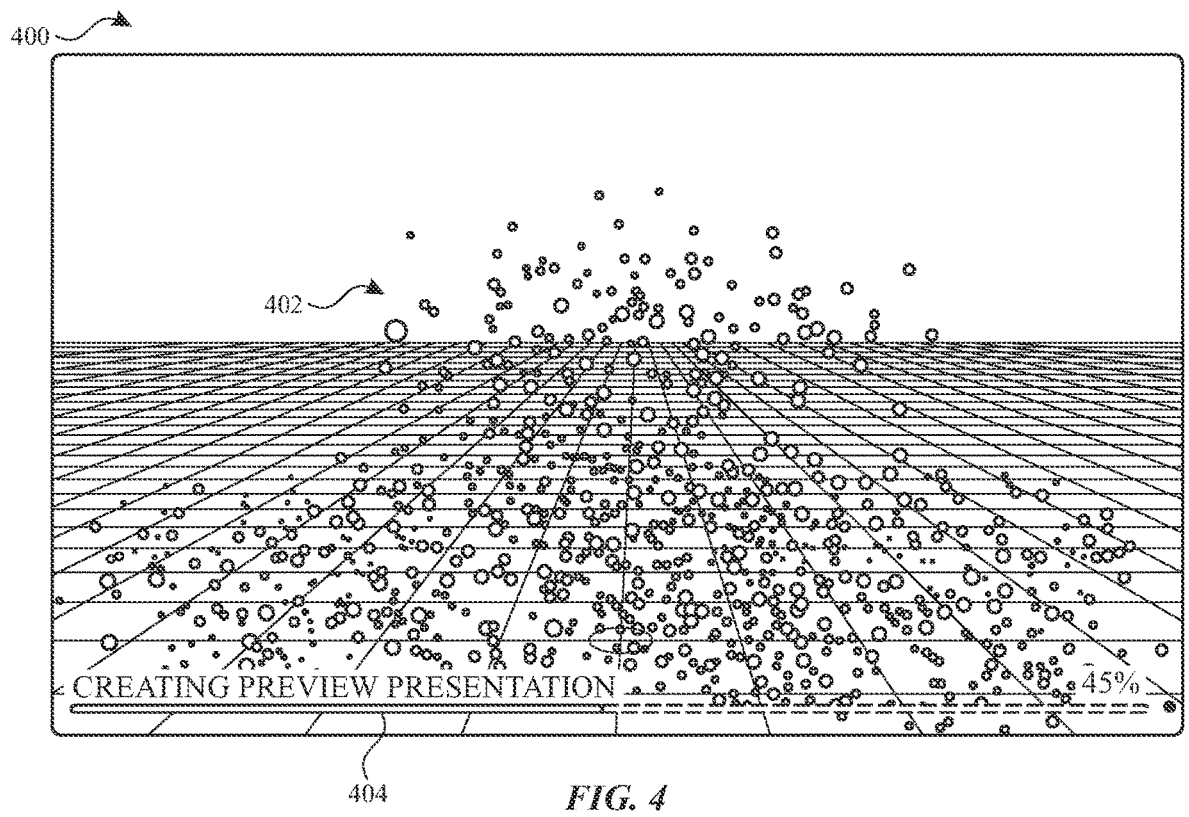
FIG. 4 illustrates an example first point representation of the three-dimensional object according to examples of the disclosure.
Figure 5:
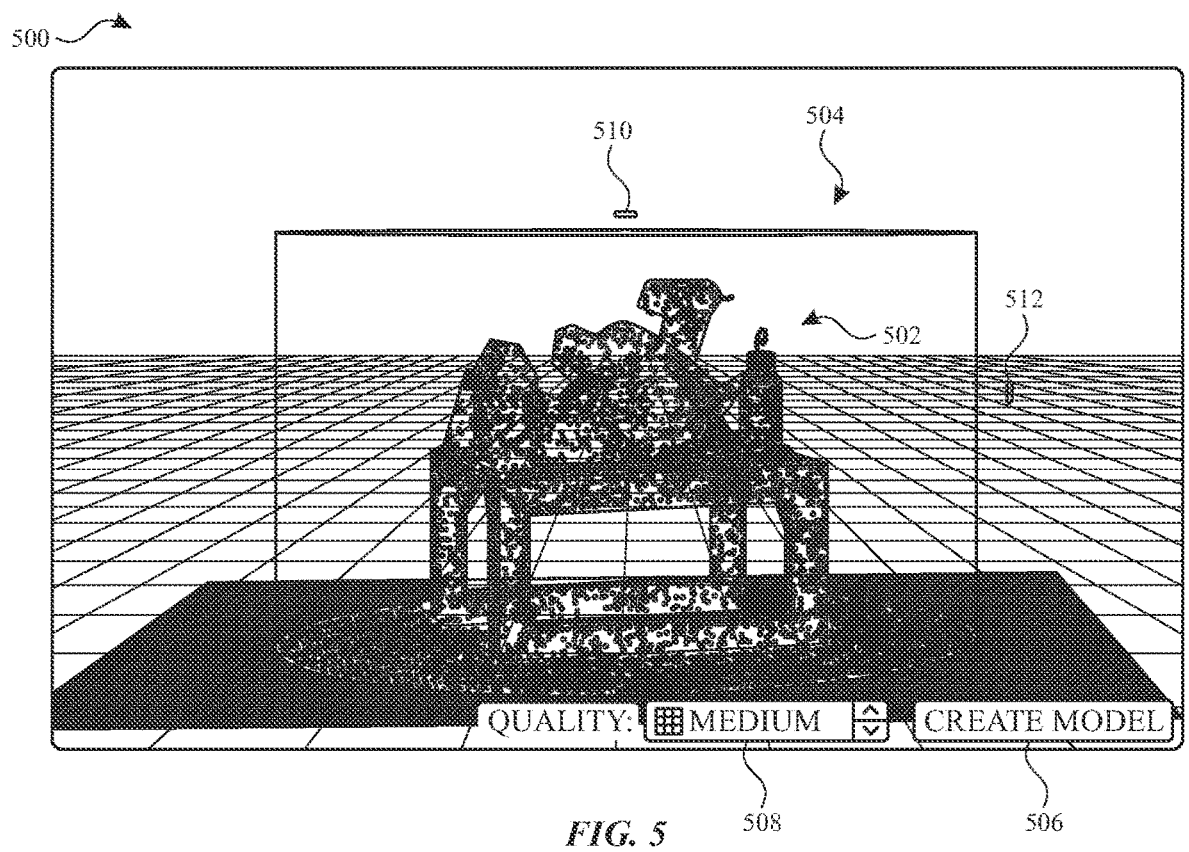
FIG. 5 illustrates an example second point representation of the three-dimensional object according to examples of the disclosure.

In some examples, the reconstruction process can include generation of a point representation of the three-dimensional object. Optionally, the generation of the point representation of the three-dimensional object can occur after previewing the images in the preview user interface 300, selecting and/or modifying the images, and/or determining which object(s) to focus on and/or which aspect(s) or object(s) to exclude. FIGS. 4-5 illustrate first and second point representations of the three-dimensional object according to examples of the disclosure. In some examples, the first point representation can correspond to a point representation during the generation of the point cloud representation and the second point representation can correspond to a point cloud representation at the conclusion of the point cloud generation. As described herein, in some examples, a visual indication of progress of generation of the point cloud can be displayed to a user by changing an appearance of points in the point representation corresponding to the progress.

In an initial state (e.g., upon initiation of the process to generate a point cloud representation), the user interface can display a plurality of points. In some examples, the points can be spherical in shape, though it is understood that the point representation can include points with alternative shapes (e.g., cubes, ellipses, icosahedrons, or any suitable regular or irregular shape). In some examples, in the initial state the plurality of points can be distributed randomly within the user interface or within a region of the user interface (e.g., a region near the floor shown in user interfaces 400, 500). In some examples, in the initial state the plurality of points can have a uniform size (e.g., a uniform radius/diameter). In some examples, in the initial state the plurality of points can have a random distribution of sizes (e.g., a non-uniform radius/diameter, optionally within a maximum or minimum size). In some examples, the plurality of points can have a characteristic of the raw photos. For instance, the plurality of points optionally has color characteristics drawn from the raw images (e.g., sampling the colors from images). In some examples, the plurality of points can be presented in a greyscale representation of the colors of the images. As illustrated in FIG. 4, the one or more points generally represent the images of the three-dimensional object 320 (e.g., tool table).

As illustrated in FIG. 4, user interface 400 displays a first point representation 402 during the generation of the point cloud of a three-dimensional object (e.g., corresponding to three-dimensional object 320). The first representation 402 can include a display of a representation of a plurality of points.

However, unlike the initial representation, first representation 402 can show a visualization of the progress of generating the point cloud. For instance, in some examples, the visualization of progress includes changing an appearance of plurality of points relative to the initial state corresponding to the progress. For example, in some examples, the changing of the appearance includes moving a subset of the plurality of points toward or into place corresponding to the final location within in the point cloud as more data becomes available during the processing. In some examples, the changing of the appearance includes lightening the color (e.g., increasing the brightness) of a subset of the plurality of points as progress increases. In some examples, the changing of the appearance includes a change in color of a subset of the plurality of points as the progress increases (e.g., points change in color to the colors of the point cloud representation or to color from greyscale). In some examples, changing the appearance can include changing the size (e.g., shrinking the radius size) and/or density (e.g., increasing the density of points relative to the initial state) of the plurality of points. In some examples, the changing of the appearance can include moving the points, changing the lighting and/or color of the points, and/or changing the size and/or density of the points.

As shown in FIG. 4, the appearance of the plurality of points can provide a visual indication of progress of generating a point cloud. Additionally or alternatively, in some examples, the user interface 400 can also include a graphical user interface element and/or text representation of progress. For example, FIG. 4 illustrates progress bar 404 and/or a percentage (e.g., 45%). In some examples, the progress bar 404 can be displayed concurrently with the plurality of points (e.g., the first representation 402) in the user interface 400.

As the plurality of points progress to a second point representation, the appearance of the plurality of points finalize to display an example finalized point representation (e.g., a point cloud) of the three-dimensional object. For example, and as illustrated in FIG. 5, user interface 500 presents a second point representation 502 (e.g., a finalized point cloud). In some examples, in the second point representation 502 the points can have a uniform size, and/or the point density and colors can correspond to the point density and colors for points in the final point cloud representation.

In some examples, user interface 500 can include a bounding box 504 around the second point representation 502 (e.g., around the point cloud). Additionally or alternatively, user interface 500 can include user interface element 506 (e.g., a user selectable button) to create a three-dimensional model representation from the point cloud (e.g., a mesh reconstruction) and/or user interface element 508 (e.g., a dropdown menu) to select quality of the three-dimensional model. In some examples, and as illustrated in FIG. 5, second point representation 502 can represent a preview of the three-dimensional representation of the three-dimensional object (e.g., a low-quality version of the generation of the three-dimensional representation of the three-dimensional object).

Figure 6:
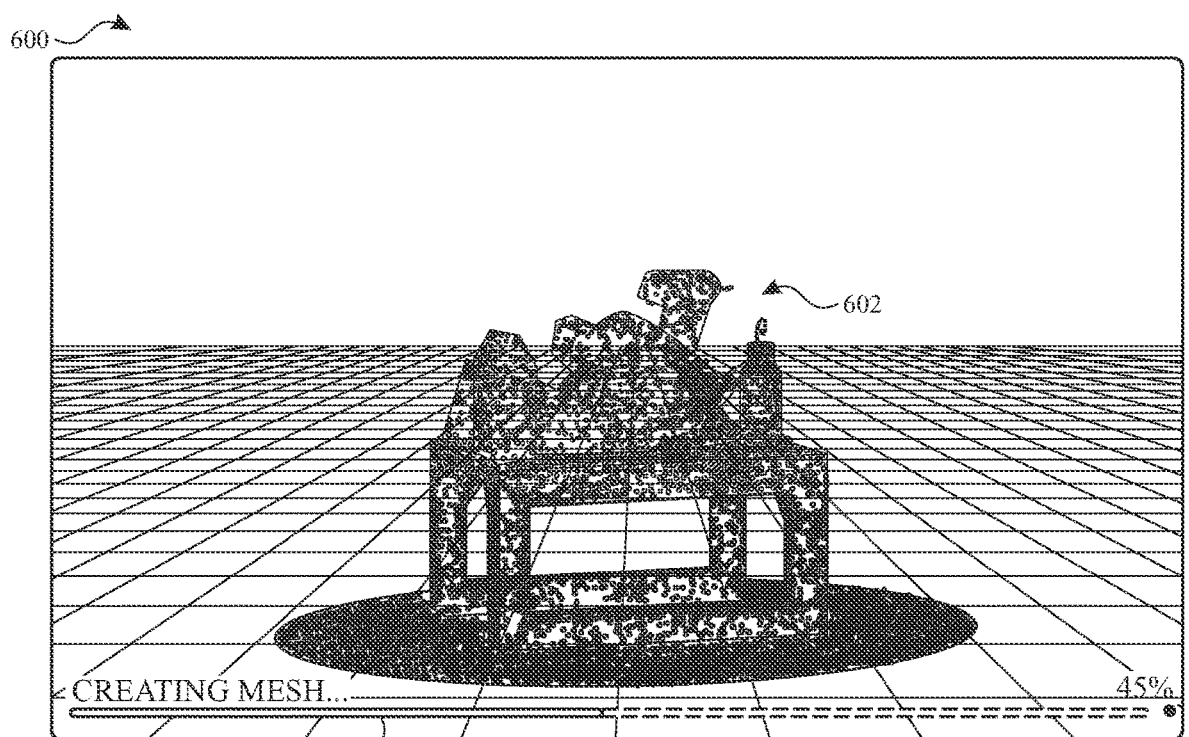
FIG. 6 illustrates an example third point representation of the three-dimensional object according to examples of the disclosure.
Figure 7:
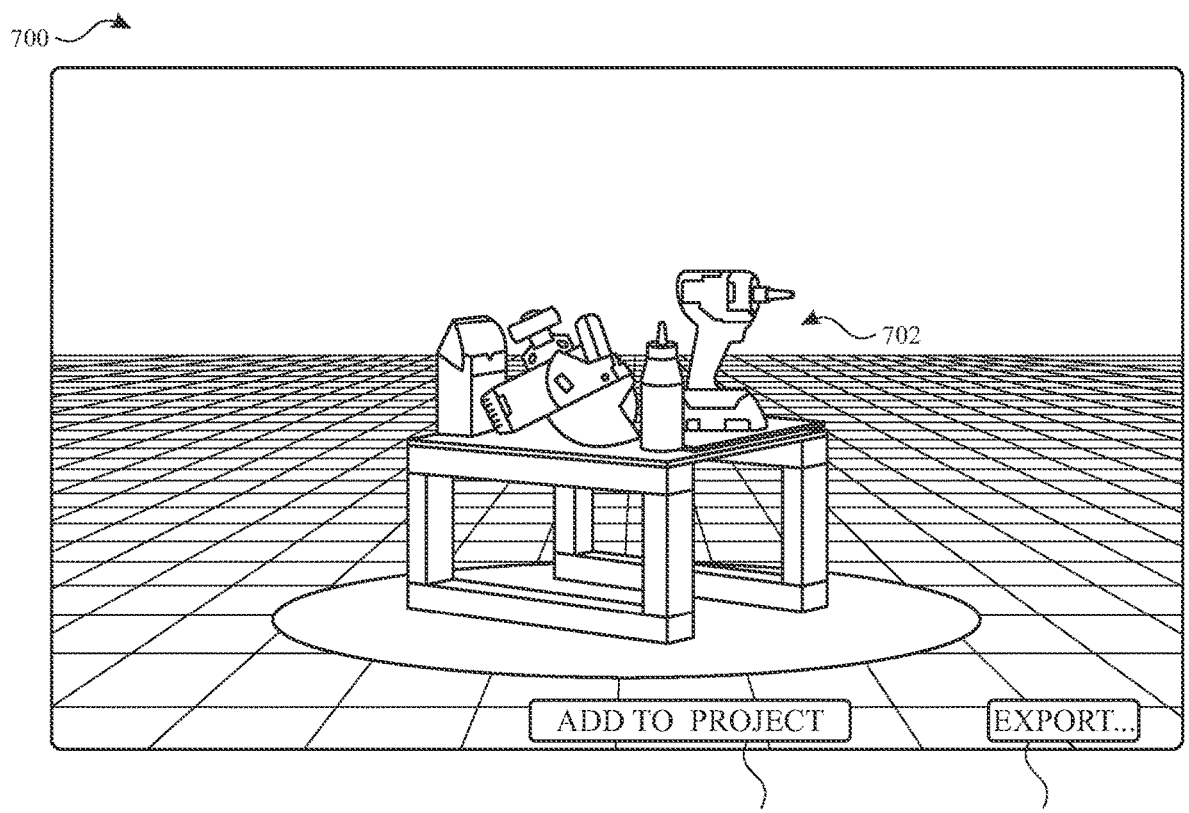
FIG. 7 illustrates an example second representation of the three-dimensional object according to examples of the disclosure.

In some examples, and prior to generating the three-dimensional model of the three-dimensional object, the user can interact with bounding box 504 to crop the portions of the second point representation 502 of three-dimensional object to be included in the three-dimensional model. For example, as shown in FIGS. 6-7, portions of the point representation outside the bounding box 504 of FIG. 5 are excluded from the three-dimensional (mesh) model. Additionally, the user interface 500 can include the ability to alter the characteristics of the bounding box. For example, FIG. 5 illustrates bounding box 504 with two handle affordances 510 and 512, though it is understood that the bounding box 504 can include more than two handle affordances. In some examples, bounding box 504 can be repositioned by the user by interacting with handle affordance 510 to move bounding box 504 within the environment relative to the second point representation 502. In some examples, the dimensions of the bounding box can be adjusted using handle affordance 510 and/or 512 (and/or additional handle affordances that are not shown). For example, the handle can be used to adjust the length, width, and height of a rectangular bounding box or to adjust the circumference and height of a cylindrical bounding box.

In some examples, user interface element 506 (e.g., a user selectable button) can be selectable to request initiation of a process to generate a second representation (e.g., mesh/model reconstruction) of three-dimensional object 320 different than the point cloud representation. In some examples, the user may also select an output quality of the second representation (e.g., user interface element 508 indicates the quality setting of medium in FIG. 5). In some examples, the quality settings can include low, medium, or high, among other possibilities. In some examples, initiation of the process to generate the three-dimensional model can cause the user interface to cease displaying bounding box 504.

FIG. 6 illustrates an example third point representation of the three-dimensional object according to examples of the disclosure. For instance, and as illustrated in FIG. 6, user interface 600 presents a third representation 602 of three-dimensional object 320 (e.g., tool table) during the process to generate a three-dimensional mesh reconstruction of three-dimensional object 320 (e.g., tool table). In some examples, third point representation 602 includes a plurality of points corresponding to second point representation 502 (e.g., a point cloud). However, in some examples, unlike second point representation 502, the third point representation 602 changes an appearance of the point cloud to provide a visualization of progress of the generation of the three-dimensional model. For example, a visual indication of progress using the third point representation 602 can include changing an appearance of third point representation 602 corresponding to the progress. For instance, if the progress percentage of finalizing the mesh model is 45%, the appearance of the third point representation 602 includes a change of appearance applied to 45%. In some examples, changing an appearance of the third point representation 602 comprises beginning with a relatively dark point cloud (e.g., darkening the color compared with second point representation 502) corresponding to an initial state (e.g., 0% progress). As progress for generating the three-dimensional model continues, the point cloud can lightening up (e.g., with the percentage of the point cloud lightened corresponding to the percentage of the progress). In some examples, the lightening can be presented as a linear effect from the top of the point cloud to the bottom of the point cloud in user interface 600. It is understood that the lightening can be applied with different orientations for a linear effect (e.g., bottom to top, left to right, or right to left) or using other effects. Alternatively, in some examples, changing an appearance of the third point representation 602 comprises beginning with a greyscale point cloud corresponding to an initial state (e.g., 0% progress). As progress for generating the three-dimensional model continues, color can replace greyscale points in the point cloud (e.g., with the percentage of the point cloud with colored points instead of greyscale corresponding to the percentage of the progress). In some examples, the coloring can be presented as a linear effect from the top of the point cloud to the bottom of the point cloud in user interface 600. It is understood that the coloring can be applied with different orientations for the linear effect (e.g., bottom to top, left to right, or right to left) or using other effects. As shown in FIG. 6, the appearance of the plurality of points can provide a visual indication of progress of generating a point cloud. Additionally or alternatively, in some examples, the user interface 600 can also include a graphical user interface element (e.g., progress bar 604) and/or text representation of progress ("45%").

In some examples, once the second representation is finalized, the computing system ceases display of the third point representation and presents a final three-dimensional representation (e.g., a mesh reconstruction). For instance, FIG. 7 illustrates an example second representation of the three-dimensional object according to examples of the disclosure. For example, and as illustrated in FIG. 7, user interface 700 presents a second representation 702 of three-dimensional object 320 (e.g., tool table). As illustrated in FIG. 7, finalized second representation 702 is a model representation of three-dimensional object 320 based on the images from FIG. 3 including texturized mesh surfaces (not a point cloud representing vertices of the mesh surfaces). In some examples, user interface 700 can include user interface elements to take actions with respect to the second representation 702. For example, user interface 700 includes user interface elements 704 and 706 to add the second representation 702 to a project within a content authoring application (e.g., optionally part of the application 202) or to export the second representation 702 to storage or another application on computing system 200 or an alternative computing system (e.g., by wired or wireless connection). For example, and as illustrated in FIG. 7, user interface element 704 can be a user selectable button that is selectable to add finalized second representation 702 to a project in a content creation application. Additionally or alternatively, user interface element 706 can be a user selectable button that is selectable to export second representation 702 to another location on computing system (e.g., to save the file or add the file to another application) or alternative computing system.

Figure 8:
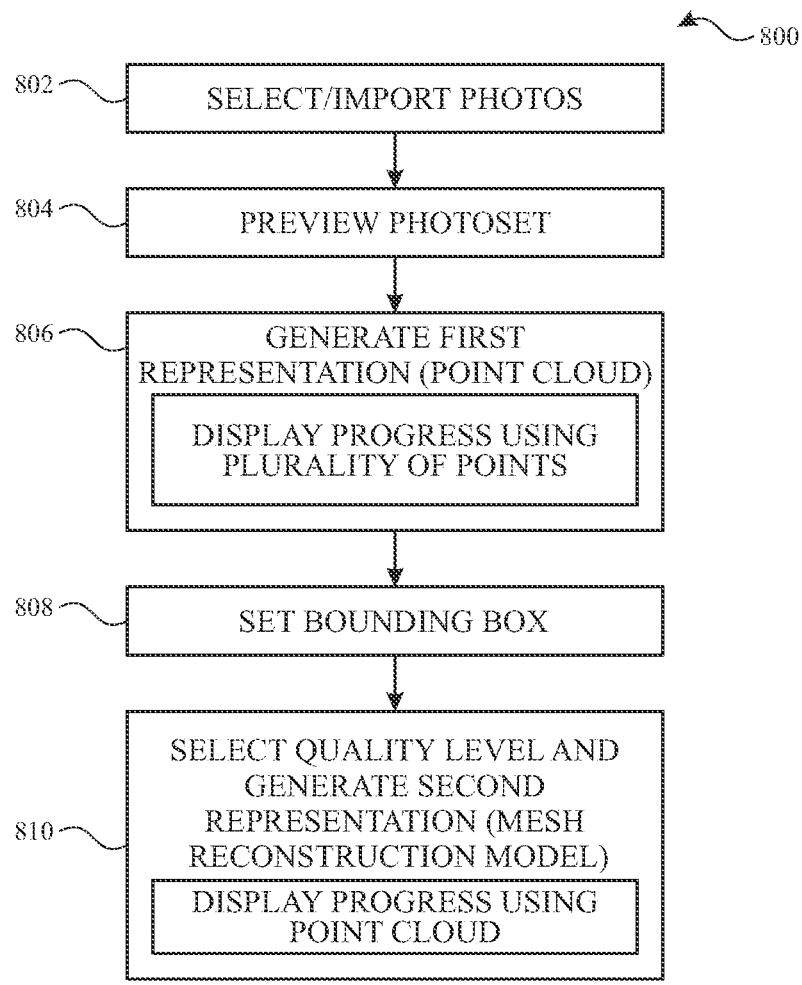
FIGS. 8-9 illustrate example flowcharts of generating a three-dimensional representation of an object from images or object captures according to example of the disclosure.
Figure 9:
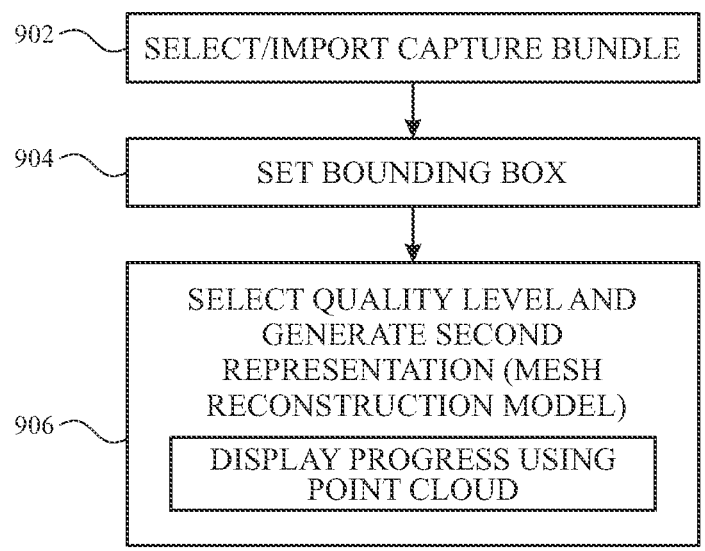

FIGS. 8-9 illustrate example flowcharts of generating a three-dimensional representation of an object from images or object captures according to examples of the disclosure. As noted above, the input data for a three-dimensional model can include a plurality of raw images or a capture bundle. In some examples, the process for generating the three-dimensional object can vary based on whether the input data is a plurality of images or a capture bundle. For example, flowchart 800 represents a process for generating a three-dimensional model from a plurality of raw images and flowchart 900 represents a process for generating a three-dimensional model from a capture bundle.

At operation 802, the computing system displays a user interface for a user of computing system 200 to select the plurality of images to use to generate the three-dimensional representation of the three-dimensional object. As described herein, in some examples, the selection can include a drag-and-drop operation illustrated in the context of the user interface illustrated in FIG. 2. In some examples, the plurality of images can be stored on computing system 200 (e.g., computing system 100) and/or received from another computing system (e.g., computing system 101). In some examples, at operation 804, the computing system displays a user interface for a user to preview and/or review the plurality of photos (or a subset) to use to generate the three-dimensional representation of the three-dimensional object. For example, the preview user interface 300 can be used to preview the images, modify characteristics of the images, mask images, and/or curate a subset of images to use for mesh reconstruction. At operation 806, the computing system then processes the plurality of images (or the subset of the plurality of images) to generate a point cloud. In some examples, the computing system displays a user interface indicating the progress of the process to generate the point cloud as shown in user interface 400-500. For example, the user interface can display a sparse cloud of a plurality of points and the appearance of the plurality of points can change during the generation of the point cloud. Additionally or alternatively, in some embodiments, the user interface can display a preview mesh that the user can use to set or adjust the bounding box. In this scenario, the point cloud may or may not be displayed to the user. Additionally or alternatively, in some examples, progress can also be indicated by a progress bar and/or text. At operation 808, the computing system displays a user interface to enable the user to apply and/or adjust a bounding box to crop the point cloud representation. For example, user interface 500 illustrates the bounding box 504 and user interface elements (handle affordances 510 and 512) to adjust the placement and dimensions of the bounding box. At operation 810, the computing system displays a user interface to enable the user to select the quality level of the three-dimensional model and initiating processing of the three-dimensional model from the point cloud. For example, user interface 500 illustrates user interface element 506 to create a three-dimensional model representation from the point cloud and/or user interface element 508 to select quality of the three-dimensional model. In some examples, while generating the three-dimensional model, the computing system displays a user interface indicating the progress of the process to generate the three-dimensional model from the point cloud as shown in user interface 600. For example, the user interface can display the point cloud, and the appearance of the plurality of points of the point cloud can change during the generation of the model (e.g., brightening portions of the point cloud representing the progress). Additionally or alternatively, in some examples, progress can also be indicated by a progress bar and/or text.

Flowchart 900 represents a process for generating a three-dimensional model from a capture bundle. In some examples, at operation 902, the computing system displays a user interface for a user to select the capture bundle. In some examples, the selection can include a drag-and-drop operation illustrated in the context of the user interface illustrated in FIG. 2. In some examples, the capture bundle can be stored on computing system 200 (e.g., computing system 100) and/or received from another computing system (e.g., computing system 101). Because the capture bundle includes different or additional information (e.g., depth information, gravity information, pose information, etc.) compared with a plurality of photos, as noted above, flowchart 900 can optionally omit operations of flowchart 800 to process the plurality of raw images. In some such examples, the capture bundle can include a point cloud that is the same or similar to the point cloud generated by operation 806. At operation 904, the computing system displays a user interface to enable the user to apply and/or adjust a bounding box to crop the point cloud representation (e.g., corresponding to operation 808). At operation 906, the computing system displays a user interface to enable the user to select the quality level of the three-dimensional model and initiate processing of the three-dimensional model from the point cloud (e.g., corresponding to operation 810).

In some examples, the processes illustrated and described with reference to flowchart 800 and/or 900 are performed at a computer system (e.g., computing system 100, 200, such as a desktop or laptop computer, a tablet, a smartphone, etc.) including a display and one or more input devices for receiving user input (e.g., keyboard, mouse, touch pad, touch screen, etc.). In some examples, the processes illustrated and described with reference to flowchart 800 and/or 900 are governed by or executed in accordance with instructions that are stored in a non-transitory computer-readable storage medium (e.g., memory 104) and that are executed by one or more processors of a computing system, such as the one or more processors 102 of computing system 100. Some operations in the processes illustrated and described with reference to flowchart 800 and/or flowchart 900 are optionally combined and/or omitted. In some examples, the order of some operations in the processes illustrated and described with reference to flowchart 800 and/or 900 are optionally changed. For instance, in some examples, the process illustrated in flowchart 800 may skip operation 804 and/or operation 808 (e.g., generating a point cloud and/or mesh reconstruction without preview and/or cropping). Additionally or alternatively, in some examples, the process illustrated in flowchart 800 may be modified to have a selection of quality at the user interface corresponding to operation 804 instead of operation 810, and/or the final model can be generated without showing the generation of the intermediate point cloud at operation 806. Additionally or alternatively, the process illustrated in flowchart 800 may set up a bounding box before operation 806 (e.g., as part of the preview user interface 300). Additionally or alternatively, the process illustrated in flowchart 800 may provide for the selection of the quality at operation 808 instead of operation 810.

The forgoing description with reference to FIGS. 1-9 primarily focuses on user interfaces, devices, and processes for receiving (e.g., importing or otherwise obtaining) a set of images and/or a capture bundle associated with a physical object, and using the images and/or capture bundle to generate a virtual representation of the physical object. As described below, an electronic device can, additionally or alternatively, include various user interfaces to facilitate the initial capture of these sets of images and/or capture bundles.

In some examples, an electronic device (e.g., computing system 100, 101, and/or 200) provides an object capture user interface (e.g., associated with an object capture application) that facilitates capture of images of a three-dimensional physical object for generating a virtual representation of the physical object, such as a point cloud representation and/or a mesh representation of the object as described with reference to FIGS. 4-9. An object capture user interface can optionally be used to capture a set of images or a capture bundle, such as the set of images and capture bundle described with reference to FIGS. 1-9.

In some examples, an object capture user interface includes a first object capture user interface for identifying a target physical object for which a virtual representation will be generated, and a second object capture user interface for providing various types of feedback to the user during the object capture process (e.g., after the target physical object has been identified for capture and the electronic device has initiated the process of capturing images of the target physical object). Although the examples of FIGS. 10-28 depict user interfaces shown on a display of a handheld device such as a cell phone, the user interfaces described herein are optionally implemented on a different type of electronic device, such as a head-mounted device (e.g., a headset used for presenting augmented reality (AR) environments to a user), a smart watch, a tablet, a laptop, or another type of device.

Figure 10:
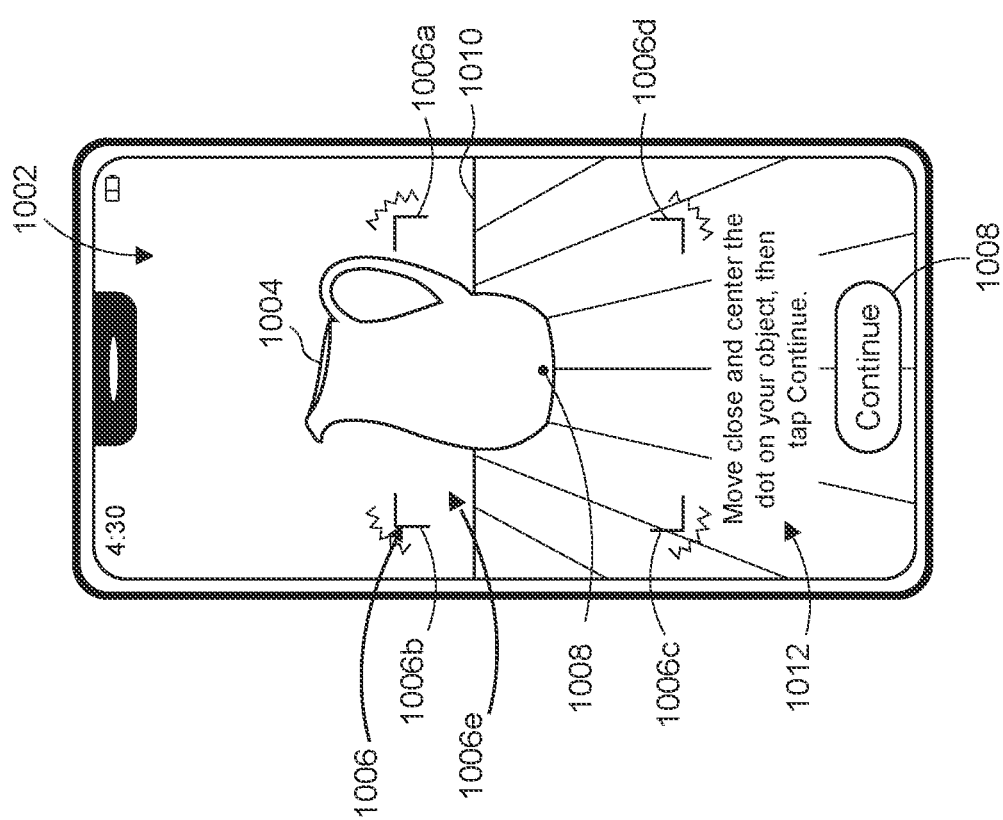

FIG. 10 depicts a first object capture user interface 1002 for identifying a target physical object to capture. First user interface 1002 is optionally presented (e.g., displayed) on a display of an electronic device, which is optionally a touch-screen display such as on display 106 of computing system 100 (e.g., on a hand-held device), a projection-based display (e.g., on a head-mounted device), or another type of display. In some examples, the view is viewed by a user wearing a head-mounted device (e.g., viewed by the user through transparent lenses as a pass-through view, without being detected by cameras). The view of the physical environment is optionally a live view of the physical environment that is in the field of view of the electronic device (e.g., an area of the physical environment that is captured by the sensors of the electronic device) and/or within the field of view of the user (e.g., if the user is wearing a head-mounted device). First user interface 1002 includes a view of a physical environment of the electronic device that includes a pitcher 1004 and a surface 1010 (which may be, for example, a table top, a floor, or another surface). In some examples, the view is detected by one or more sensors of the electronic device, such as detected by one or more cameras of the electronic device (e.g., image sensor 116).

In some examples, the electronic device analyzes data representing the live view of the camera to identify various physical characteristics of a physical object(s) in the field of view of the electronic device, such as by identifying the location of edges and/or surfaces of the physical object, the height, depth, and/or width of the physical object, whether the object is resting on a physical surface (e.g., surface 1010), and/or other physical characteristics. In some examples, the physical surface 1010 is identified by the electronic device (e.g., using cameras and/or image processing techniques) based on having a planar surface that is optionally coincident with or parallel to (or within 1, 3, 5, 7, 9, or 11 degrees of parallel to, for example) a floor or ground plane of the physical environment.

In some examples, first object capture user interface 1002 includes a two-dimensional virtual reticle 1006 (e.g., having vertices 1006a-1006d that define a two-dimensional reticle area 1006e) to assist the user in positioning the field of view of the electronic device such that a target physical object, such as pitcher 1004, is presented (e.g., displayed) within the virtual reticle 1006. Although the examples herein depict a two-dimensional virtual reticle 1006 as being rectangular in shape, other shapes (e.g., circles, pentagons, octagons, etc.) can be used without departing from the scope of the invention.

As shown in the example of FIG. 10, virtual reticle 1006 is concurrently displayed with (e.g., overlaid on) the view of the physical environment. In some examples, a physical object must be resting on a surface (e.g., surface 1010) for electronic device to identify the physical object as a target physical object. In some examples, displaying first object capture user interface 1002 includes displaying a targeting affordance 1008 in the center of virtual reticle 1006 (e.g., in the plane of the virtual reticle and/or display). In some examples, the virtual reticle 1006 and/or targeting affordance 1008 are screen-locked (or head-locked, for a head-mounted device implementation) and remain locked in the same position on the display and/or in the user's field of view when the electronic device is moved within the physical environment to change the field of view.

In some examples, a virtual reticle (such as virtual reticle 1006) is initially presented with a first visual characteristic before a target physical object has been identified, and is subsequently presented with a second visual characteristic different from the first visual characteristic after a target physical object has been identified (e.g., to provide feedback to the user that a physical object has been identified for object capture). For example, a virtual reticle is optionally initially presented as having a first color, transparency, line thickness, line pattern (e.g., dashed, solid, connected, unconnected), shape, brightness, and/or other visual characteristic, and is optionally presented with a second color, transparency, line thickness, line pattern (e.g., dashed, solid, connected, unconnected), shape, brightness, and/or other visual characteristic after the physical object has been identified (e.g., in response to detecting a target physical object within virtual reticle 1006 and/or in response to receiving a user input confirming identification of a target physical object).

In the example of FIG. 10, the virtual reticle 1006 is initially displayed as four unconnected vertices 1006a-1006d (e.g., corners) of a rectangle (e.g., before the electronic device has identified a target physical object for capture) with the targeting affordance 1008 in the center of the virtual reticle 1006.

In some examples, the electronic device determines whether a physical object (e.g., pitcher 1004) on a surface (e.g., surface 1010) is partially or entirely contained (e.g., displayed) within the area 1006e of the virtual reticle 1006 (e.g., within the rectangular area defined by the four unconnected corners 1006a-1006d). For example, the electronic device optionally determines whether the user has centered or otherwise located a physical object in the virtual reticle 1006 and/or the field of view is at an appropriate distance from the physical object such that all or most of the physical object is presented within the virtual reticle 1006 on the display, and the targeting affordance 1008 overlays a central region of the target physical object (e.g., in a region that includes the geometric center of the target physical object).

In some examples, if the electronic device determines that a physical object on a surface is not at least partially (e.g., at least 30, 40, 50, 60, 70, 80, or 90% of the view of the physical object) or optionally entirely (e.g., 100%) presented within the area of the virtual reticle 1006 (e.g., within the rectangular area defined by the four unconnected corners 1006a-1006d), the electronic device optionally provides feedback to the user to alert the user that the field of view of the electronic device needs to be moved such that a target physical object is within (e.g., overlaid by) the area of the virtual reticle 1006, such as described below.

In some examples, in response to determining that a physical object on a surface is not mostly or entirely within the area of the virtual reticle 1006, such as depicted in FIG. 10, the electronic device provides feedback to the user by visually vibrating (e.g., shaking) the displayed image of the virtual reticle 1006 and/or by providing a different form of alert, such as by displaying a different visual alert, displaying a textual message 1012, issuing an audible alert (e.g., using speaker 108), and/or issuing a haptic alert (e.g., physically vibrating a portion the electronic device, such as using haptic generator 124 or 125). Optionally, the textual message and/or audible alert provides guidance to the user to instruct the user how to appropriately position the field of view of the electronic device relative to the physical object to enable the object capture process to proceed.

In the example of FIG. 10, the electronic device determines that pitcher 1004 is not mostly or entirely contained within the area of the virtual reticle 1006, and in response, the electronic device provides feedback to the user by visually vibrating (e.g., shaking) the displayed image of the virtual reticle 1006 (as indicated by the zigzag lines near corners 1006a-1006d), displays textual message 1012, and (optionally) displays a continue affordance 1008 that, when selected, causes the electronic device to re-determine whether the target physical object is appropriately located within the area of the virtual reticle 1006 and/or to proceed with the object capture process. For example, in response to receiving feedback such as textual message 1012, the user may move the field of view of the electronic device to better locate the pitcher 1004 within the virtual reticle 1006 and may select the continue affordance 1008 to cause the electronic device to proceed to the next step of the object capture process. Optionally, the electronic device detects selection of the continue affordance 1008 based on a user input that can include a user tapping the affordance 1008 on a touch screen, selecting the affordance 1008 using a mouse click, looking at the affordance 1008 and/or making an air gesture (e.g., while wearing a head-mounted device), and/or by providing other user inputs.

Figure 11:
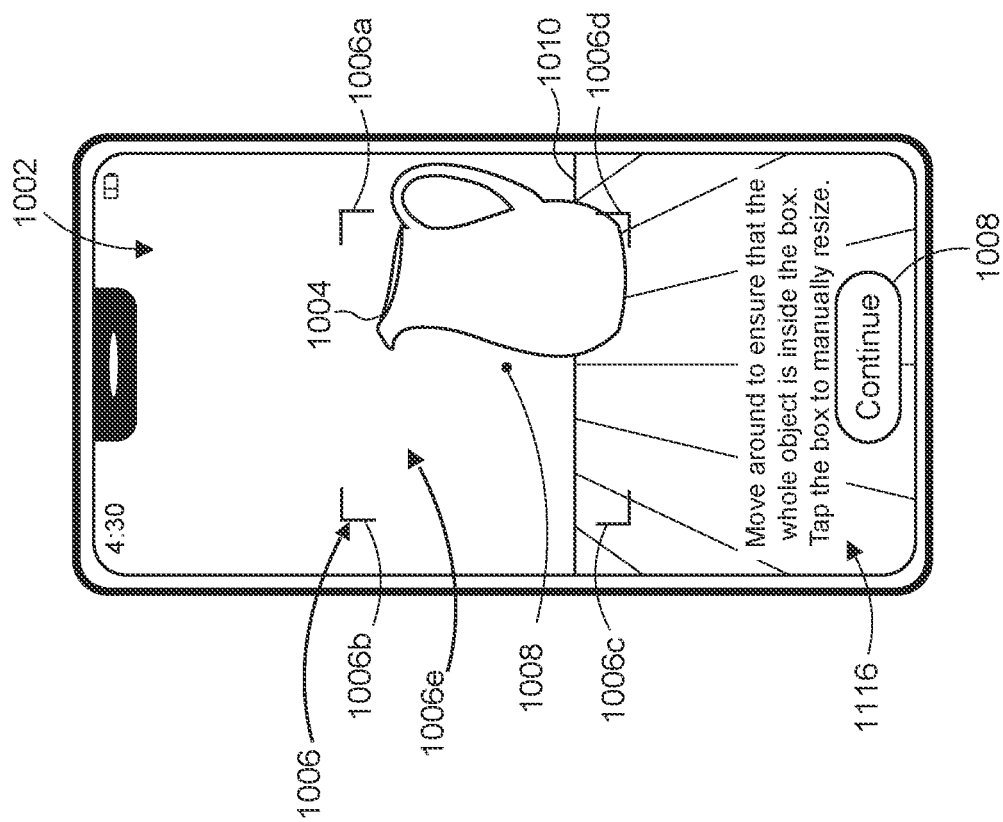
FIGS. 10-29 illustrate example user interfaces for generating a three-dimensional virtual representation of a physical object according to examples of the disclosure.

From FIG. 10 to FIG. 11, the user has moved the field of view of the electronic device such that the pitcher 1004 is mostly within the area of virtual reticle 1006 but is not centered or located within virtual reticle 1006. In some examples, if the electronic device determines that a physical object (e.g., pitcher 1004) is mostly or entirely contained within the area 1006e of the virtual reticle 1006 (e.g., within the rectangular area defined by the four unconnected vertices 1006a-1006d) but is not centered in the virtual reticle (e.g., the targeting affordance 1008 is greater than a threshold virtual distance (on the display) from a centroid or geometric center of the physical object) and/or has more than a threshold distance 1102 (e.g., a virtual distance on the display) between an edge of the physical object and a boundary of the area of the virtual reticle 1006, the electronic device provides feedback to the user to alert the user that the field of view of the electronic device should be moved such that the target physical object is centered in the virtual reticle 1006 and/or such that there is less than a threshold distance between an edge of the target physical object and the boundary of the rectangular area of the virtual reticle 1006, such as by displaying a textual message 1116, visually vibrating the virtual reticle 1006, issuing an audible alert (e.g., using speaker 108), and/or issuing a haptic alert (e.g., physically vibrating a portion of the electronic device). Optionally, the textual message and/or audible alert provides guidance to the user to instruct the user how to appropriately position the field of view of the electronic device relative to the physical object to enable the object capture process to proceed.

Figure 12:
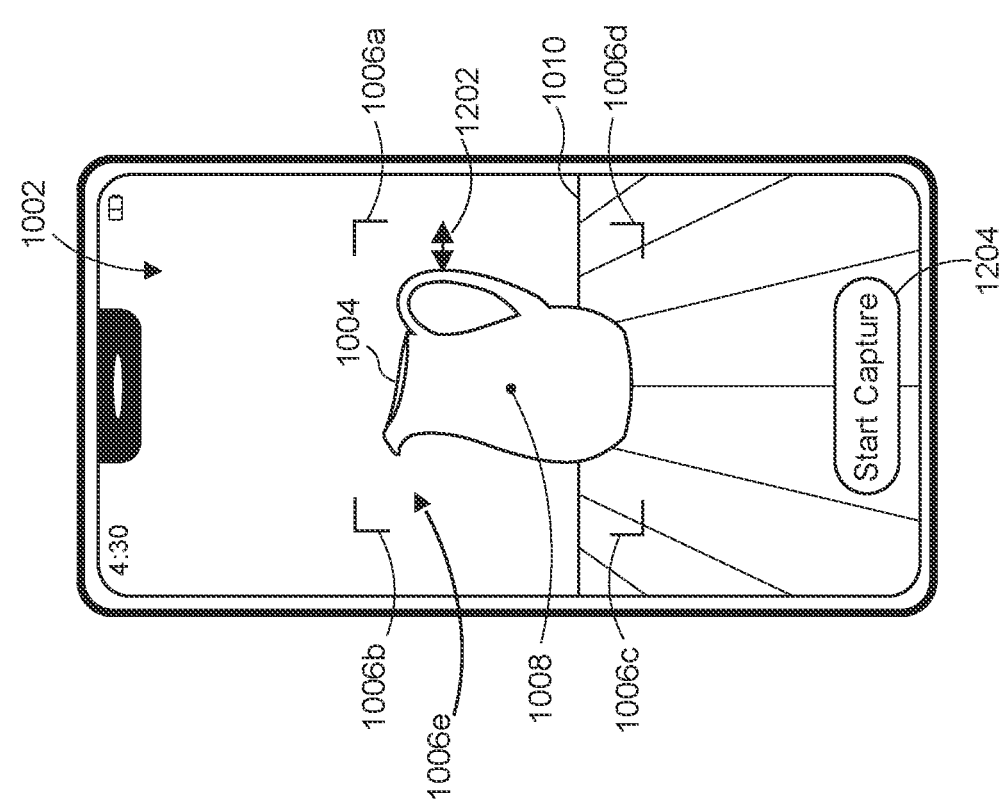

As shown in FIG. 12, in some examples, if the electronic device determines that pitcher 1004 is mostly or entirely within the area 1006e of the virtual reticle 1006 (e.g., within the rectangular area defined by the four unconnected corners), is centered in the virtual reticle 1006, and/or has less than a threshold distance 1202 between one or more edges of the pitcher 1004 and one or more edges of the area of the virtual reticle 1006 (e.g., indicating that the field of view of the electronic device is such that the target object has been identified and object capture can begin), the electronic device changes a visual characteristic of the virtual reticle 1006 to indicate, to the user, that the field of view of the electronic device is now in an appropriate position to begin the object capture process. For example, the electronic device optionally changes a color, shape, thickness, opacity, line width, or other visual characteristic of the virtual reticle 1006.

In some examples, a user can manually resize two-dimensional virtual reticle 1006 (optionally, before or after a target physical object has been identified and/or the visual characteristics of the virtual reticle 1006 are changed) by selecting a portion of the virtual reticle 1006 and providing a drag input. For example, a user can optionally click (using a mouse), tap on virtual reticle 1006 (e.g., on a touch screen of a hand-held device) to select virtual reticle 1006, virtually tap on the virtual reticle 1006 using an image of a physical or virtual finger appearing in the display, or can optionally look at virtual reticle 1006 and provide an air gesture such as an air pinch gesture (e.g., while wearing a head-mounted device with eye-tracking sensors and/or other image sensors) to select virtual reticle 1006. After selecting virtual reticle 1006, the user can then resize virtual reticle 1006 by providing a drag input (e.g., including a first amount of dragging) on, for example, a touch screen, or by making an air drag gesture detected by a head-mounted device (optionally while holding the fingers or hand in a particular position, such as a pinch position). In some examples, the electronic device resizes virtual reticle 1006 in accordance with the first amount of dragging, such as by expanding an area of virtual reticle 1006 by moving a selected edge of virtual reticle 1006 by an amount corresponding to the first amount of dragging. In some examples, in response to detecting a user input to resize virtual reticle 1006, the electronic device ceases to automatically resize virtual reticle 1006.

In some examples, changing a visual characteristic of the virtual reticle 1006 in response to determining that a target physical object has been identified includes presenting an animation that transforms the two-dimensional virtual reticle 1006 into a virtual three-dimensional shape (e.g., a three-dimensional bounding box) that visually encloses, on the display (or in the field of view of a user wearing a head-mounted device), some or all of the target physical object, such as described in more detail below with reference to FIGS. 13-17.

Optionally, if the electronic device determines that pitcher 1004 is entirely within the area of the virtual reticle 1006, is centered in the virtual reticle 1006, and/or has less than a threshold distance 1202 between an edge of the target physical device and the boundary of the rectangular area of the virtual reticle 1006, the electronic device displays a capture initiation affordance 1204 that, when selected, causes the electronic device to present the animation that transforms the two-dimensional virtual reticle 1006 into the virtual three-dimensional shape. Optionally, the electronic device detects selection of the capture initiation affordance 1204 based on a user input that can include a user tapping the affordance 1204 on a touch screen, selecting the affordance 1204 using a mouse click, looking at the affordance 1204 and/or making an air gesture (e.g., while wearing a head-mounted device), and/or by providing other user inputs. Optionally, the electronic device displays the capture initiation affordance 1204 concurrently with displaying the view of the physical environment and the two-dimensional virtual reticle 1006.

Figure 13:
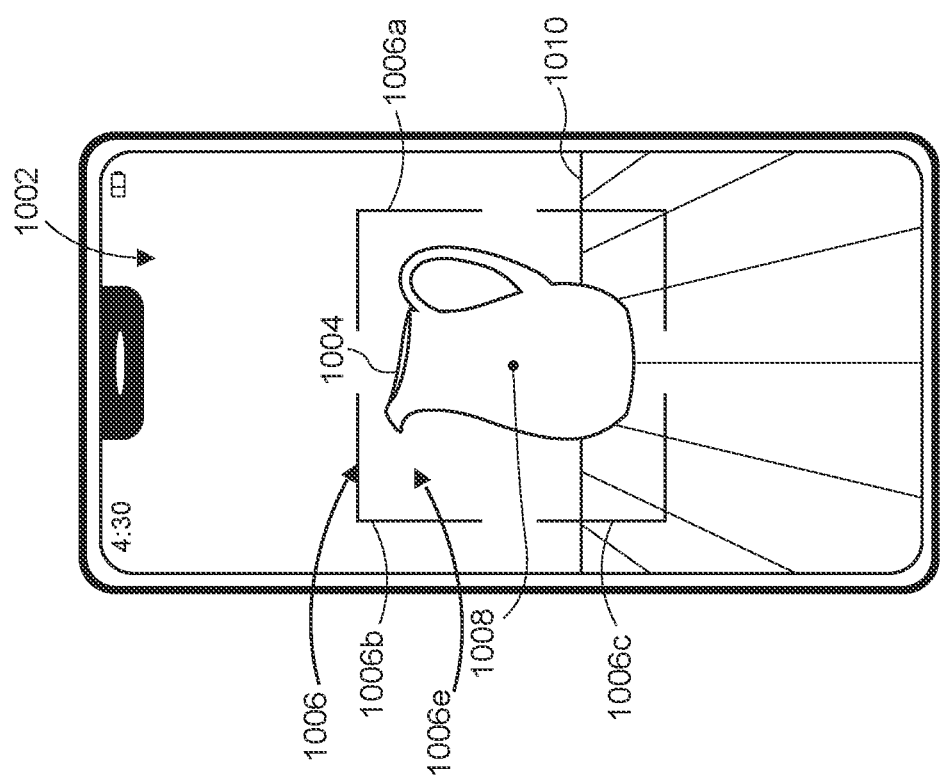
Figure 14:
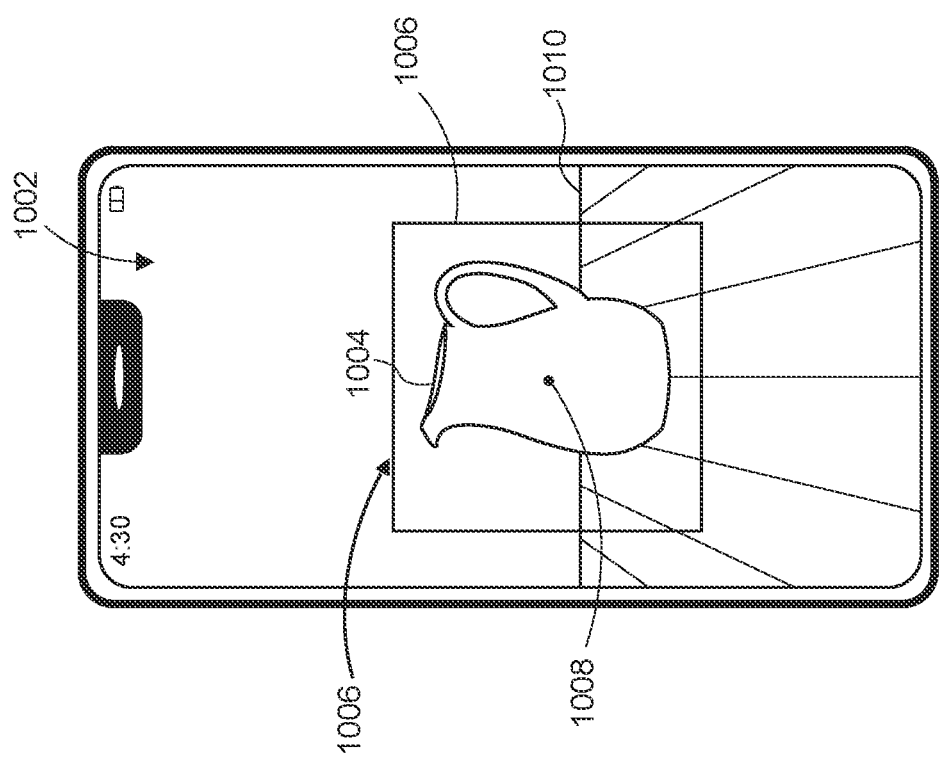

FIGS. 13-14 depict two discrete times during an example animated transition of the two-dimensional virtual reticle 1006 to a three-dimensional bounding box, in which the corners of the virtual reticle 1006 first extend towards each other (FIG. 13), optionally until they join to form a complete outline of a rectangle in the plane of the display (FIG. 14). Optionally, the corners of the virtual reticle 1006 extend towards each other but do not extend far enough to join each other and form a complete outline of a two-dimensional shape (e.g., a rectangle), thereby remaining unconnected.

Figure 15:
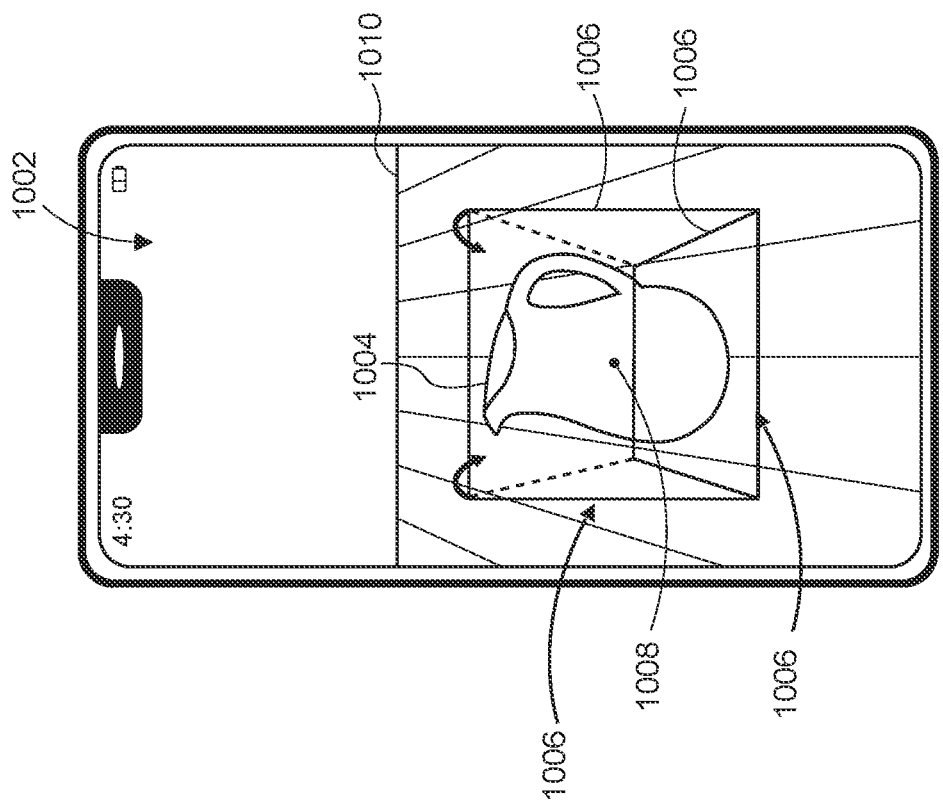

In some examples, after extending the corners of the virtual reticle 1006 to a final extension (e.g., to form an outline of a rectangle or other shape) such as shown in FIG. 14, the electronic device continues the animation by visually rotating, over a period of time, the virtual reticle 1006 from the plane of the display onto the plane of the physical surface 1010 such that the virtual reticle 1006 appears to be resting or slightly above the plane of the physical surface 1010 and encircling (e.g., surrounding) a bottom portion of the target physical object (e.g., pitcher 1004). Optionally, targeting affordance 1008 continues to be displayed during this transition. FIG. 15 depicts a representation of this portion of the animation. Although two reticles are shown in FIG. 15 with arrows to illustrate the motion between starting and ending positions of virtual reticle 1006 as it rotates onto the plane of the surface 1010, optionally, only one animated reticle is actually displayed by the electronic device and the arrows are not displayed.

Figure 17:
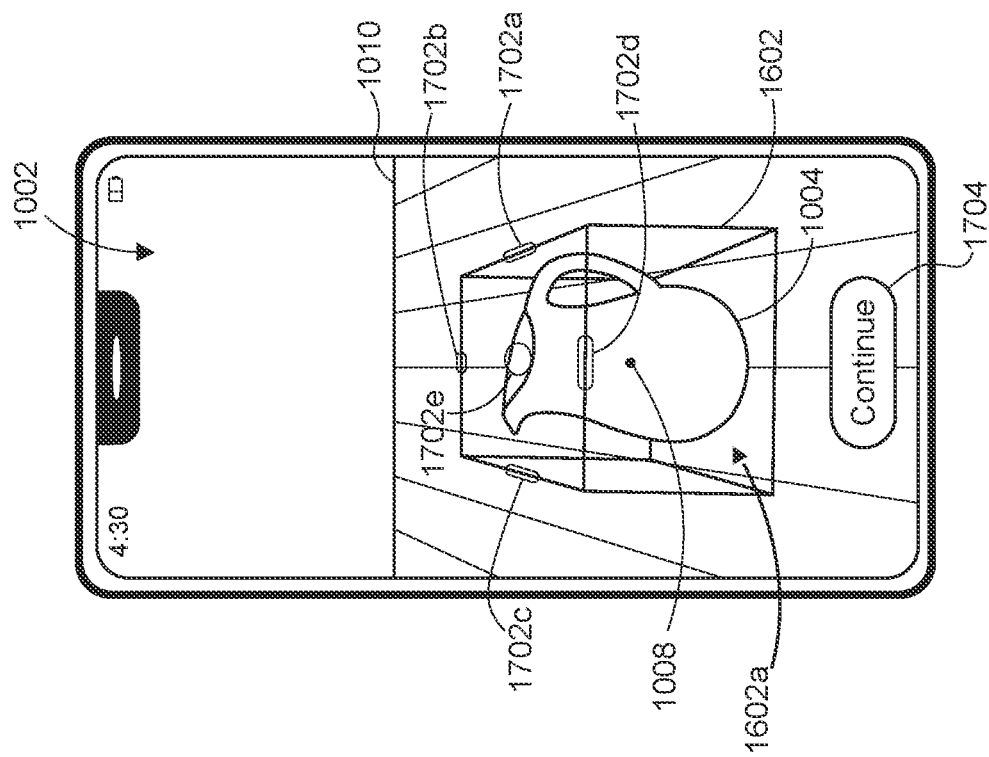
Figure 16:
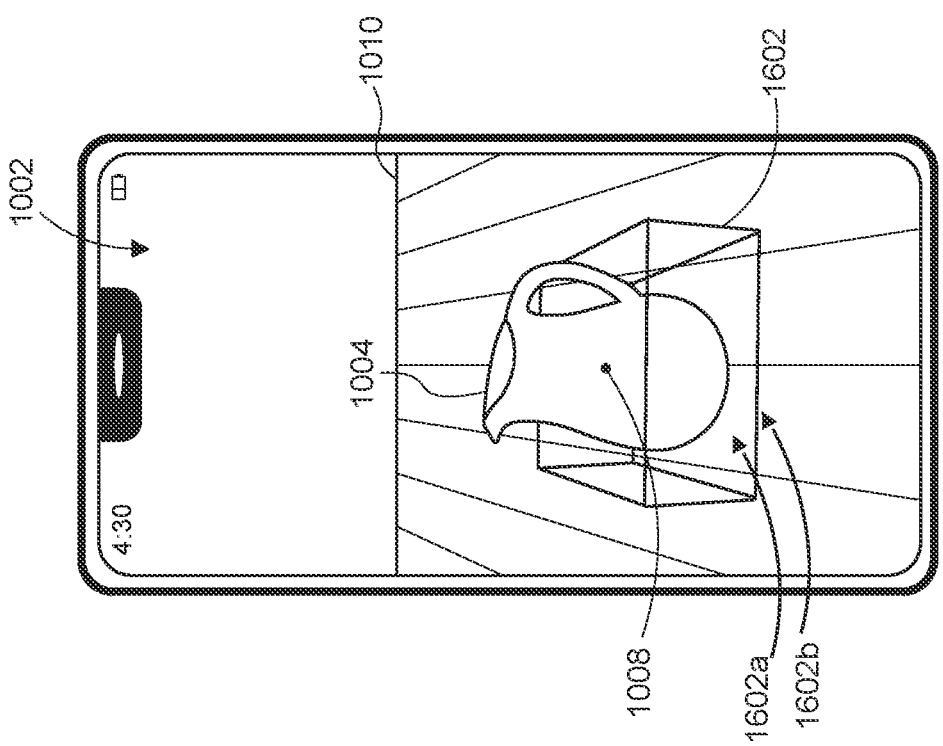

As depicted in FIGS. 16-17, In some examples, after rotating the virtual reticle 1006 onto the plane of the surface 1010, the electronic device continues the animation by adding height to the outline of the two-dimensional virtual reticle 1006 to transition to displaying an outline of a virtual three-dimensional bounding shape 1602 around at least the portion of the pitcher 1004 (e.g., such that some or all of the pitcher 1004 is contained within a volume 1602a of the bounding shape 1602). In some examples, the bottom surface 1602b (e.g., the base) of the three-dimensional bounding shape 1602 corresponds to the shape of the virtual reticle 1006. In the examples herein, the virtual reticle 1006 is a rectangle, and thus the base of the three-dimensional bounding shape 1602 is also a rectangle (e.g., the bounding shape 1602 is a cuboid, which may be referred to as a bounding box). If instead, the virtual reticle was a circle, for example, the three-dimensional bounding shape would optionally be a cylinder, and so on.

In some examples, the electronic device automatically selects and/or adjusts the height, width, and/or depth of the virtual three-dimensional bounding shape 1602 based on a detected height, width, and/or depth of the physical object. For example, the electronic device optionally estimates a height, width, and/or depth of the physical object based on one or more views of the object and automatically (e.g., without user intervention) adds sufficient height, width, and/or depth to the virtual bounding shape 1602 such that the virtual bounding shape 1602 is tall and/or wide enough to enclose (or nearly enclose) the physical object within the volume 1602a of the bounding shape 1602. In some examples, the accuracy of the estimated dimensions of the physical object depends on the view(s) of the physical object detected by the electronic device and the electronic device optionally adjusts (e.g., automatically) the height, width, and/or depth of the bounding shape 1602 based on detecting new views of the physical object as the user moves the field of view of the electronic device around the physical object.

As shown in FIG. 17, In some examples, displaying the animation and/or displaying the virtual bounding shape 1602 optionally includes displaying one or more virtual handle affordances 1702a-1702e on one or more edges and/or surfaces of the virtual bounding shape 1602, such as edges or surfaces of a top portion of the virtual bounding shape 1602 and/or a bottom portion of the virtual bounding shape. In the example of FIG. 16, the virtual bounding shape 1602 includes a first handle affordance 1702a on a first edge, a second handle affordance 1702b on second edge, a third handle affordance 1702c on third edge, and a fourth handle affordance 1702d on fourth edge. Virtual bounding shape 1602 also includes a center handle affordance 1702e in the center of a top surface of the virtual bounding shape 1602. In some examples, handle affordances 1702a-1702e are displayed in a top portion of virtual bounding shape 1602, such as in a plane of a top surface of virtual bounding shape 1602.

In some examples, the electronic device displays handle affordances 1702a-1702e concurrently with adding height to the virtual reticle to form the virtual bounding shape 1602 and/or after the height of the virtual bounding shape 1602 has ceased to increase. In some examples, displaying handle affordances 1702a-1702e includes displaying lighting effects associated with handle affordances 1702a-1702e, such as displaying a virtual glow around handle affordances 1702a-1702e and/or displaying virtual reflections off of handle affordances 1702a-1702e (e.g., that cause handle affordances 1702a-1702e to appear to be shiny or metallic similar to handle affordances on a cabinet, and/or to suggest to the user that handle affordances 1702a-1702e are selectable and can be "pulled").

In some examples, the quantity and/or location of handle affordances 1702a-1702e displayed by the electronic device depend on the viewing angle of the electronic device relative to the physical object. For example, in some examples, the electronic device displays a bottom handle affordance (not shown) in the center of a plane of a bottom surface 1602b of the virtual bounding box in response to detecting a change in the viewing angle of the electronic device relative to the physical object, such as when the field of view of the electronic device is moved closer to the elevation of the plane of the bottom surface. In some examples, the display of the bottom handle affordance increases in visual prominence (e.g., by increasing in size and/or opacity, and/or in another manner) as the electronic device is moved closer to the elevation of the plane of the bottom surface, optionally until the bottom handle affordance is displayed with the same or similar visual prominence as handle affordances 1702a-1702e. In some examples, in response to detecting that a cursor associated with the first object capture user interface and/or a finger of the user is hovering over a respective handle, the electronic device visually increases the size of the respective handle and/or otherwise changes a visual characteristic of the respective handle.

Figure 17A:
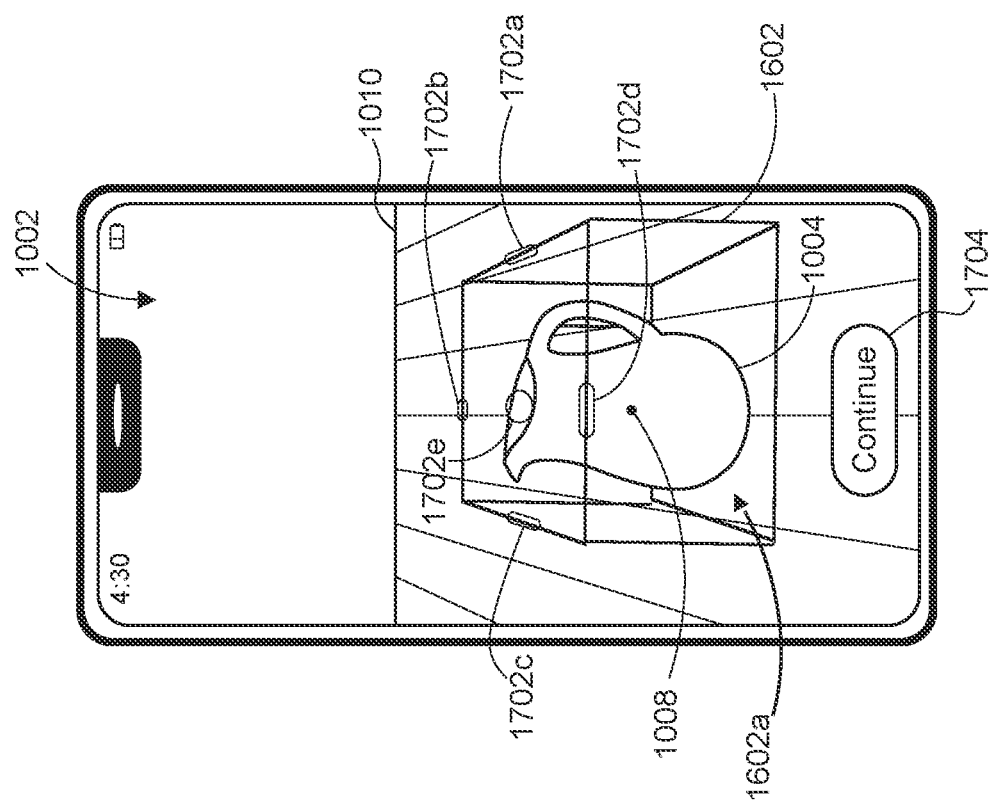

In some examples, handle affordances 1702a-1702e can be selected by the user and dragged to resize the virtual bounding shape 1602. For example, in response to detecting a first user input corresponding to a selection of second handle affordance 1702b and a second user input corresponding to a first amount of dragging of selected second handle affordance 1702b (e.g., a tap and drag input on a touch screen, or a gaze, pinch, and drag movement detected by a head-mounted device), the electronic device resizes virtual bounding shape 1602 in accordance with the first amount of dragging, as shown in FIG. 17A, in which the user has selected the first handle affordance 1702a and dragged it to the right side of the screen (from the user's perspective) to widen the bounding shape 1602. Thus, handle affordances 1702a-1702e optionally allow a user to manually resize the virtual bounding shape 1602 vertically (e.g., using center handle affordance 1702e or a bottom handle, not shown) or horizontally (e.g., using handle affordances 1702a-1702d) to change a height, width, depth, or a combination of these, such as may be desirable when the virtual bounding shape 1602 does not automatically resize to enclose all of the target physical object.

In some examples, in response to detecting that user attention is directed to a particular handle affordance 1702a-1702e, the electronic device increases the visual prominence of the particular handle affordance 1702a-1702e, such as by increasing its size or brightness, or changing its color relative to the other handle affordances. In some examples, the electronic device determines that the user's attention is directed to a handle affordance based on a direction of the user's gaze (e.g., if the user is looking at the handle affordance), based on a user providing inputs to cause a cursor to hover over a handle affordance, based on a user tapping on a handle affordance (e.g., on a touch screen), or based on other user inputs.

In some examples, in response to detecting a user input to resize the virtual bounding shape 1602, the electronic device ceases to automatically resize the virtual bounding shape 1602 (e.g., in response to detecting new views of the physical object). In some examples, in response to detecting that the user has selected a respective handle affordance 1702a-1702e, the electronic device visually increases the size of the respective handle affordance 1702a-1702e and/or otherwise changes a visual characteristic of the respective handle.

In some examples, the electronic device automatically resizes the two-dimensional virtual reticle 1006 and/or the three-dimensional bounding shape 1602 (e.g., as described earlier) before, during, and/or after the animation based on detected dimensions of the target physical object such that the virtual reticle 1006 and/or bounding shape 1602 encloses (e.g., circumscribes) all or most of the display of the target physical object, and/or such that the virtual distances (e.g., distance 1202 of FIG. 12) between edges of the virtual reticle 1006 and/or edges or surfaces of bounding shape 1602 and the edges of the target physical object are less than a threshold distance.

Returning to FIG. 17, In some examples, after and/or while the electronic device has displayed (and/or is displaying) the bounding shape 1602, the electronic device displays a continue affordance 1704 that, when selected, optionally causes the electronic device to display a prompt for the user to begin the object capture process such as described with reference to FIG. 18.

Figure 18:
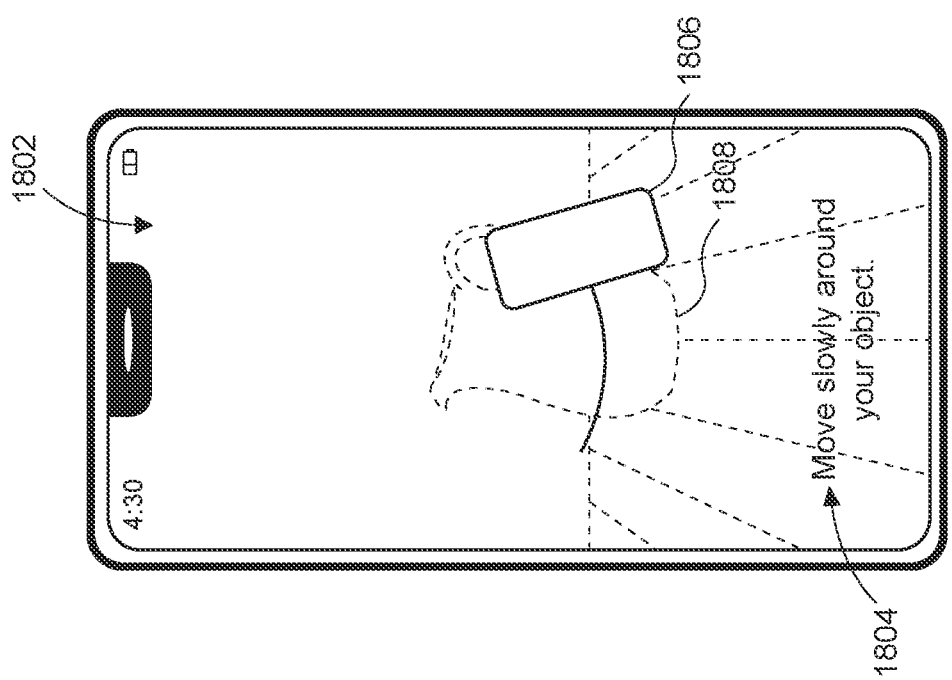

FIG. 18 depicts an example of a prompt 1802 that is optionally displayed by the electronic device in response to detecting a selection of the continue affordance 1704 in FIG. 17 (or FIG. 17A). In some examples, the prompt 1802 includes a graphical prompt that optionally includes a representation 1806 of the electronic device and/or a representation 1808 of the physical object and indicates, to the user, how to begin the capture process using the electronic device. In some examples, the prompt 1802 includes textual information 1804 that indicates, to the user, how to begin the capture process. For example, as shown in FIG. 18, the prompt 1802 optionally includes a textual message 1804 that instructs the user to move the field of view of the electronic device around the physical object to enable the electronic device to capture images of the physical object from multiple perspectives (such as from 360 degrees around the physical object) to enable the electronic device to construct an accurate virtual representation of the physical object.

As previously discussed, in some examples, an object capture user interface optionally includes a second object capture user interface for providing feedback to the user during the object capture process (e.g., after the target physical object has been identified for capture and the capture process has been initiated, such as described with reference to FIGS. 10-17A).

Figure 19:
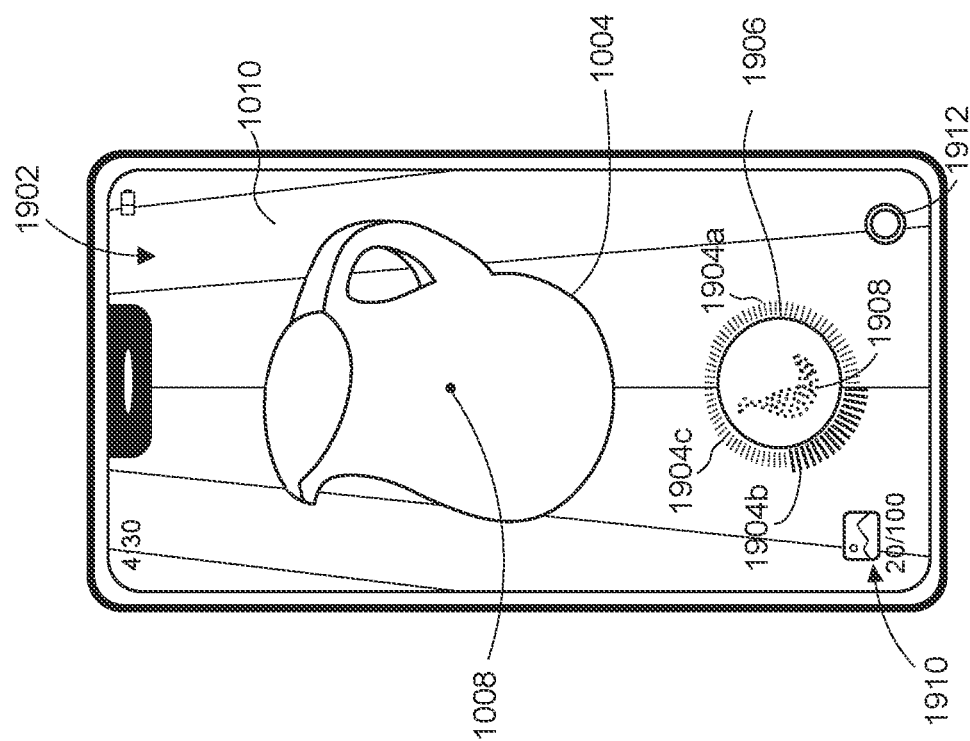

FIG. 19 depicts an example of a second object capture user interface (capture user interface 1902) that is optionally displayed by the electronic device during the object capture process. In some examples, the capture user interface 1902 provides feedback to the user during the object capture process to ensure that a sufficient quantity and/or quality of images of the physical object are obtained from a variety of perspectives of the physical object, thereby enabling the electronic device to construct an accurate three-dimensional representation of the physical object.

In some examples, the electronic device initiates the capture process in response to detecting (optionally, after detecting a selection of continue affordance 1704 as shown in FIG. 17 and/or after displaying prompt 1802 as shown in FIG. 18) a change in the field of view of the electronic device with respect to the target physical object; e.g., as the user walks around the target physical object with the field of view of the electronic device directed towards the physical object. In some examples, initiating the capture process includes displaying the capture user interface 1902 and/or beginning to automatically (e.g., without additional user input) capture images (e.g., of the physical object) when the capture user interface 1902 is displayed (e.g., in response to the same or similar inputs). For example, the electronic device optionally initiates the capture process by automatically beginning to capture images every 0.25, 0.5, 0.75, 1, 1.25 1.5, 1.75, 2, 2.5, or 3 seconds, and/or in response to detecting a change in the field of view of the electronic device.

Optionally, capture user interface includes capture affordance 1912, which when selected by a user, causes the electronic device to capture an image. For example, capture affordance 1912 is optionally a manual image capture affordance that functions similarly to a physical camera button for capturing images. Optionally, in response to detecting a selection of capture affordance 1912, the electronic ceases automatic capture of images. Optionally, the electronic device continues to automatically capture images after detecting selection of capture affordance 1912. Optionally, the electronic device forgoes automatic capture of an image in accordance with a determination that the electronic device has not moved after capturing an image in response to selection of capture affordance 1912 (e.g., to avoid capturing duplicate images).

As shown in FIG. 19, capture user interface 1902 includes a live view of the physical environment; e.g., the field of view of the electronic device. In the example of FIG. 19 the field of view of the electronic device includes the pitcher 1004 and surface 1010 described with reference to FIGS. 10-17A. Capture user interface 1902 includes a center element 1906 and multiple peripheral elements (including peripheral elements 1904a-1904c) that are arranged circumferentially around the perimeter of the center element 1906. In some examples, the peripheral elements are arranged around the perimeter with a distance between an edge of each peripheral element and the perimeter (e.g., the peripheral elements are close to but not in contact with the perimeter). The center element 1906 and the peripheral elements are overlaid on the live view such that the user can concurrently see the live view, center element 1906, and the peripheral elements. In the example of FIG. 19, the center element 1906 is circular and the peripheral elements are shown as uniformly spaced adjacent rays radiating from a perimeter of the center element 1906, with each ray corresponding to a respective perspective of the physical object. Other configurations are possible. For example, in some examples, the center element is a different shape than a circle, such as a square or ellipse. In some examples, the peripheral elements are optionally segments of a single user interface element, such as segments of a hollow disk that surrounds the center element.

In some examples, the locations of the peripheral elements around the perimeter of the center element 1906 correspond to viewing perspectives relative to the physical object. For example, a peripheral element on the left side of center element 1906 (such as peripheral element 1904b) optionally corresponds to a viewing perspective of the physical object as seen from the left side of the physical object (relative to the current view of the physical object), thereby indicating, to the user, that if the user wishes to capture images of that perspective of the physical object, the user should move the field of view of the electronic device to the left along a perimeter around the physical object. In this manner, the center element 1906 and the peripheral elements can serve as a map for the user and help guide the user to capture images of the physical object from different perspectives.

In some examples, the length of a respective peripheral element radiating from the center element 1906 increases in response to detecting that the user has moved the field of view of the electronic device to the perspective corresponding to the respective peripheral element. In some examples, the length, thickness, and/or opacity of a respective peripheral element increases in response to detecting that the electronic device has captured one or more images of the physical object (from the perspective corresponding to the respective peripheral element). For example, optionally the electronic device elongates peripheral element(s) to indicate a current perspective of the electronic device, and/or optionally darkens the peripheral element(s) after one or more images have been captured from that perspective.

In the example of FIG. 19, peripheral element 1904b is longer and darker than peripheral elements 1904a and 1904c, indicating that one or more images have been captured from the perspective associated with peripheral element 1904b and fewer (or no) images have been captured from the perspectives associated with peripheral elements 1904a and 1904c. Thus, in some examples the peripheral user elements optionally indicate, to the user, which perspectives of the physical object have been captured and which perspectives have not yet been captured, relative to a current perspective of the electronic device (e.g., the current field of view of the electronic device Optionally, the peripheral element(s) corresponding to a respective perspective stay elongated and darkened after images have been captured at the respective perspective. FIGS. 20-23 illustrate these features in more detail.

In the example of FIG. 19, the center element 1906 is depicted as being opaque (e.g., the surface 1010 is not visible through the center element 1906). In some examples, the center element is partially or fully transparent. In some examples, the center element 1906 is displayed in (or parallel to) the plane of the physical surface 1010, such that the center element 1906 appears to be adjacent to the physical object (e.g., pitcher 1004) on the physical surface 1010. In some examples, the center element 1906 serves as a visual platform upon which a preview 1908 of a virtual representation of the physical object will be displayed as it is constructed by the electronic device.

In some examples, before any images have been captured as part of the image capture process, the center element 1906 is empty (e.g., no preview of a virtual representation of the physical object is displayed on the center element) and the peripheral elements are displayed with one or more first visual characteristics. For example, the peripheral elements are optionally initially displayed with a first transparency, a first length, a first color, a first brightness, or other first visual characteristics. In some examples, once the electronic device has captured one or more images from a given perspective, the peripheral element(s) corresponding to the perspective is displayed with a second visual characteristic(s) to visually distinguish the peripheral elements representing perspectives for which images have been captured from peripheral elements representing perspectives for which images have not yet been captured, as previously discussed. In some examples, once the electronic device has captured one or more images of the physical object (e.g., pitcher 1004), the electronic device begins to construct a preview 1908 of a three-dimensional virtual representation of the physical object (e.g., a virtual model). In some examples, the preview 1908 of the virtual representation of the physical object is a preview of a point cloud representation that changes over time during the capture process as the point cloud representation is constructed and/or refined. For example, as more images are captured, the electronic device may use the additional images to generate additional points in the point cloud and add them to the preview 1908, and/or the electronic device may refine the display of existing points in the preview 1908 by adjusting the color and/or size of existing points.

In the example of FIG. 19, a portion of the peripheral elements are darkened and elongated (e.g., including peripheral element 1904b), indicating that images of the pitcher 1004 have been captured from these perspectives, but images from other perspectives have not yet been captured. The preview 1908 of the virtual representation of the pitcher 1004 is correspondingly partially complete because it is constructed based on an incomplete set of captured images.

In some examples, the electronic device changes a perspective of the preview 1908 of the virtual representation of the pitcher 1004 in accordance with a change in a perspective of the pitcher 1004 in the field of view of the electronic device as the electronic device is moved around the pitcher 1004 such that the perspective of the preview 1908 of the virtual representation mirrors (e.g., corresponds to, matches, follows) the perspective of the pitcher 1004. For example, the user can see the virtual representation from the same perspective as the physical object.

In some examples, the electronic device displays, in the capture user interface 1902, a transient visual indication and/or presents an audible indication when each image is captured. For example, the electronic device optionally displays a flash of light each time an image is captured, such as by briefly illuminating the center element 1906 and/or another element of the capture user interface, and/or optionally emits a sound indicative of capturing an image (e.g., a camera shutter sound, a click, or another sound).

As shown in FIG. 19, In some examples, capture user interface 1902 includes an indication 1910 of a quantity of images captured out of a maximum quantity of images. The maximum quantity of images optionally depends on the specific electronic device (e.g., based on the storage capacity of the electronic device and/or on other factors). In some examples, the electronic device increments the quantity of images each time an image is captured during the capture process. Optionally, the electronic device forgoes displaying the maximum quantity of images.

Figure 21:
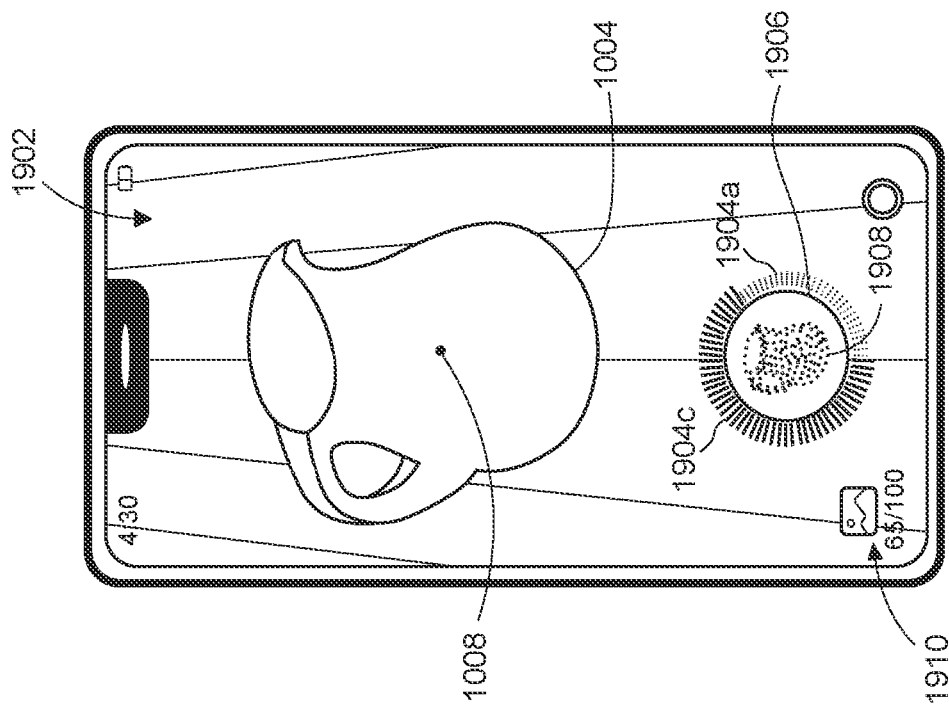
Figure 20:
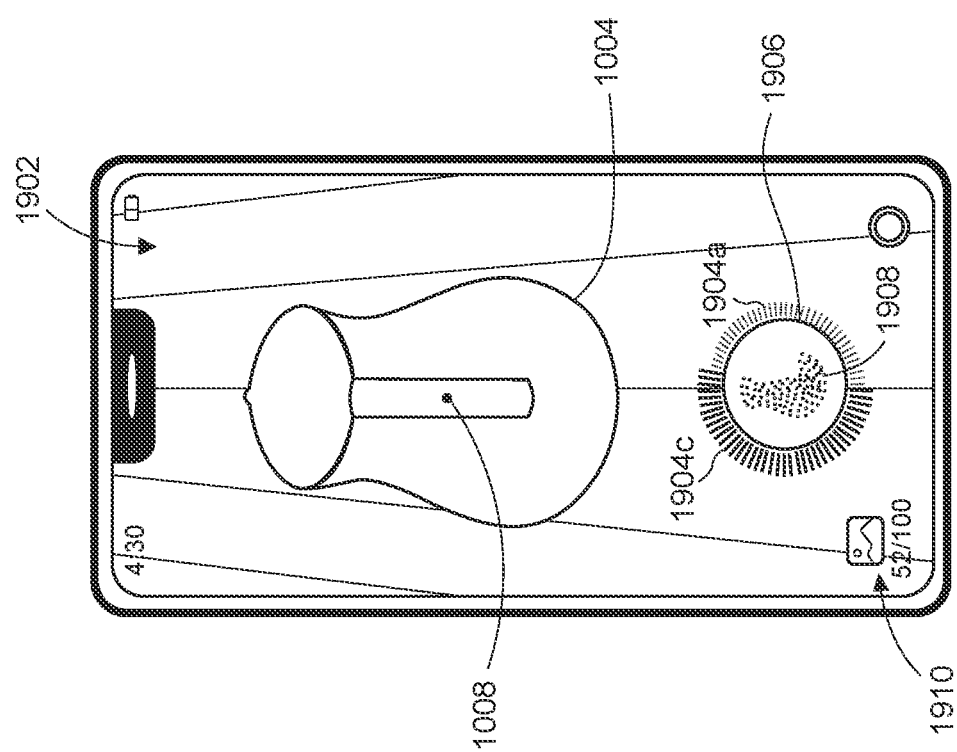

As shown in FIGS. 19-21, In some examples, as the user moves the field of view of the electronic device around the pitcher 1004, and the electronic device continues to capture more images of the pitcher 1004 from different perspectives, corresponding peripheral elements are displayed as being darker and longer to indicate that images of additional perspectives of the physical object have been captured, and a correspondingly updated preview 1908 of the virtual representation of the pitcher is displayed on or above the center element 1906. For example, in FIG. 20, peripheral element 1904c is displayed as darker and longer than it was in FIG. 19, indicating that an additional image(s) has been captured from the perspective corresponding to peripheral element 1904c.

In some examples, the electronic device changes a visual characteristic of a respective peripheral user interface element based on a quantity of images captured for a corresponding perspective of the electronic device relative to the physical object. For example, as more images are captured for a respective perspective of the physical object, the corresponding peripheral element(s) are optionally displayed as getting progressively darker and/or longer in accordance with the increasing quantity of images captured.

In some examples, the position and/or orientation of the preview 1908 of the virtual representation relative to the center element 1906 changes in accordance with changes in the viewing perspective of the pitcher 1004. For example, as shown in FIGS. 20-21, as the field of view of the electronic device is moved along a perimeter of (e.g., around) the pitcher 1004 such that different perspectives of the pitcher 1004 are visible on the display, correspondingly different perspectives of the preview 1908 the virtual representation are displayed such that the view of the virtual representation mirrors (e.g., matches, corresponds to) the view of the pitcher 1004.

As described with reference to FIGS. 22-24, In some examples, in response to detecting that the current field of view of the electronic device and/or the current ambient conditions are not suitable for capturing high-quality images, the electronic device provides feedback to the user that directs the user to change the position and/or orientation of the field of view of the electronic device, or to change the ambient lighting around the physical object, or to take other actions to improve the quality of subsequently captured images of the physical object. For example, the electronic device optionally displays graphical and/or textual feedback. In some examples, such feedback optionally includes changing a visual characteristic of the center element and/or of the peripheral element(s) in the second object capture user interface. In some examples, the electronic device ceases to automatically capture images of the object while the current field of view of the electronic device and/or the current ambient conditions remain unsuitable for capturing high-quality images.

Figure 22:
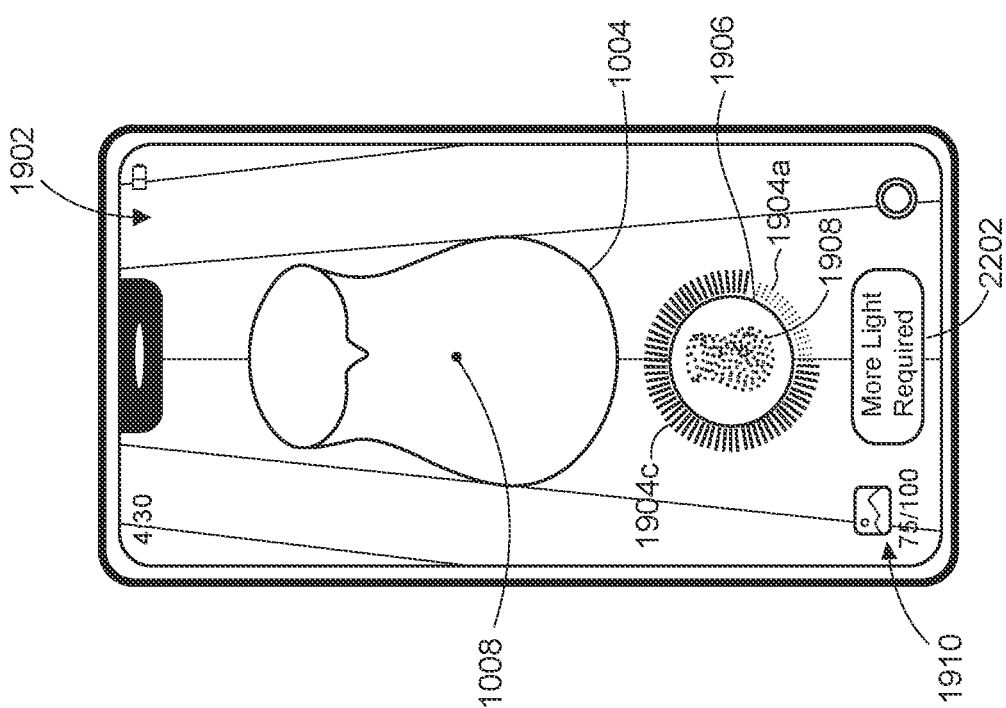

FIG. 22 shows an example in which the ambient lighting is insufficient for the electronic device to capture high-quality images of the pitcher 1004; e.g., the lighting in the physical environment is below a lighting threshold. In response to detecting that the lighting associated with the pitcher 1004 is below a lighting threshold, the electronic device provides graphical and/or textual feedback 2202 to the user indicating that the lighting is insufficient (e.g., "More Light Required"). In some examples, if the electronic device detects that lighting has been changed to be sufficient for capturing high-quality images, the electronic device ceases to display the graphical and/or textual feedback 2202.

Figure 23:
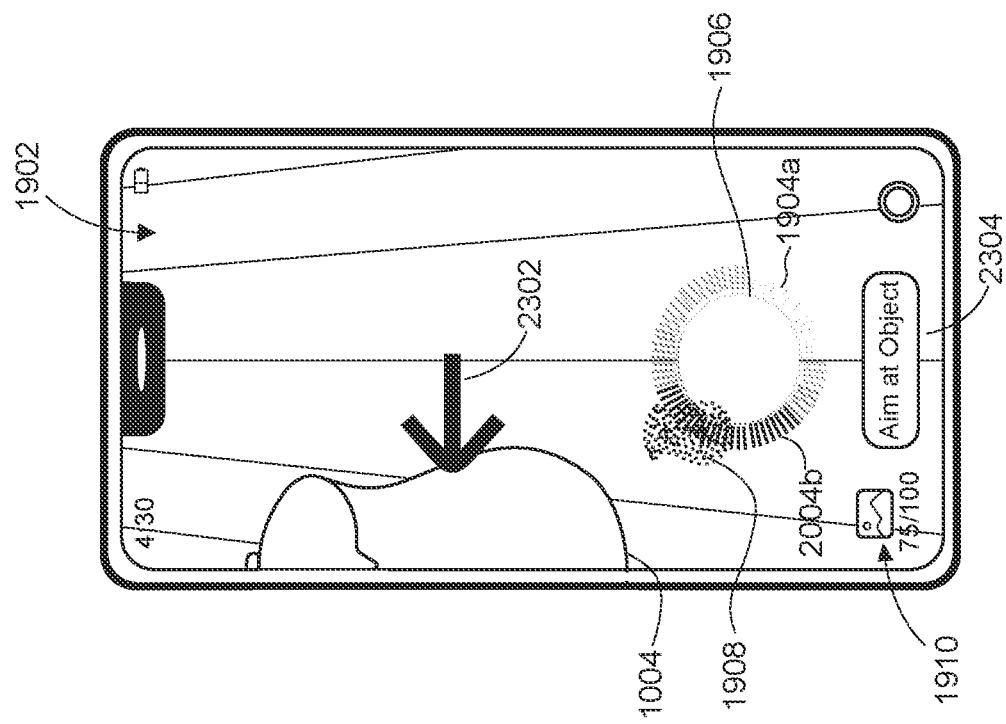

FIG. 23 shows an example in which the user has moved the field of view of the electronic device such that the pitcher 1004 is no longer centered in the display and is partially off the display (e.g., partially out of the field of view of the electronic device). The preview 1908 of the virtual representation of the physical object is likewise partially off of the center element 1906, mirroring the position of the pitcher 1004 on the display. In some examples, the electronic device moves the preview 1908 of the virtual representation of the physical object towards (or off of) an edge of the center element 1906 in accordance with a determination that the physical object is moving out of the field of view of the electronic device as the electronic device moves relative to the physical object.

As shown in FIG. 23, in some examples, in response to detecting that the position of the physical object in the field of view of the electronic device is not approximately centered in the field of view of the electronic device and/or is at least partially out of the field of view of the electronic device, the electronic device provides graphical feedback 2302 and/or textual feedback 2304 to the user indicating that the user should move the field of view of the electronic device, optionally including an indication of a direction in which the user should move the field of view.

In the example of FIG. 23, the electronic device displays an arrow pointing to the left (towards the physical object) and a textual message ("Aim at Object"), indicating to the user that the user should move the field of view of the electronic device to the left to re-center the physical object in the field of view. The electronic device optionally provides similar feedback for other directions as appropriate (e.g., an arrow pointing to the right, upwards, or downwards), depending on the location of the physical object relative to the field of view, to indicate a direction in which the user should move the field of view of the electronic device.

In some examples, at least a portion of the center element 1906, the peripheral element(s) (e.g., peripheral elements 1904a-1904c) and/or the preview 1908 of the virtual representation of the physical object fade out (e.g., become more transparent) in accordance with a determination that the physical object is moving out of the field of view of the electronic device as the electronic device moves relative to the physical object. In some examples, an amount and location of fading corresponds to an amount of the physical object that is out of the field of view of the electronic device. In some examples, the center element 1906 and/or the peripheral element(s) fade out with a spatial gradient (e.g., a gradual spatial transition in transparency) in which portions of these elements that are farther away from the preview 1908 of the virtual representation are more faded than portions that are nearer to the preview 1908 of the virtual representation.

In some examples, if the electronic device detects that the field of view has been moved such that the physical object is again displayed on the display and/or is re-centered in the field of view, the electronic device ceases to display the graphical and/or textual feedback and/or displays the center element, peripheral element(s), and/or preview of the virtual representation without fading.

Figure 24:
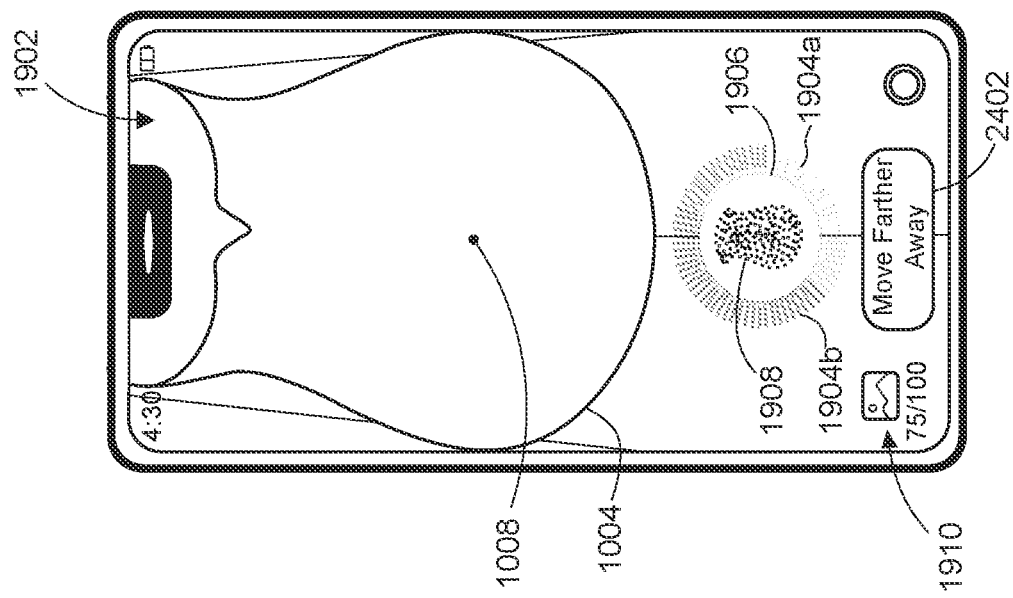

FIG. 24 shows an example in which the user has moved the field of view of the electronic device such that the electronic device is too close to the pitcher 1004 and a portion of the pitcher 1004 is no longer displayed on the display. As shown in FIG. 24, In some examples, in response to detecting that the field of view of the electronic device is too close to the physical object (e.g., is within a threshold distance of the physical object) and/or that the physical object is at least partially out of the field of view while the physical object is approximately centered in the field of view (indicating that the electronic device is too close to the physical object), the electronic device provides graphical and/or textual feedback to the user indicating that the user should move the field of view of the electronic device farther away from the physical object.

In the example of FIG. 24, the electronic device displays a textual message 2402 ("Move Farther Away") that provides guidance to the user regarding repositioning the field of view of the electronic device, and, additionally or alternatively, provides graphical feedback by fading out a portion of the center element 1906 and at least some of the peripheral elements (e.g., peripheral element 1904a), indicating to the user that the user should move the field of view of the electronic device farther away from the pitcher 1004. In some examples, the location (e.g., around the center element 1906) and amount of fading of the center element 1906 and/or peripheral element(s) are based on how close the electronic device is to the physical object; e.g., the closer the electronic device is to the physical object, the greater the amount of fading (e.g., greater transparency) and the larger the portion of the center element 1906 and peripheral element(s) that are faded. For example, the electronic device optionally starts by fading the portion of the center element and the peripheral element(s) that are closest to the user, and continues fading additional portions of the center element and/or additional peripheral elements as the user moves the electronic device closer to the physical object.

In some examples, if the electronic device detects that the field of view has been moved such that the field of view is no longer too close to the physical object (e.g., the physical object is again entirely displayed on the display and/or is centered in the field of view), the electronic device ceases to display the graphical and/or textual feedback, optionally by fading in (e.g., decreasing the transparency of) the center element and or peripheral element(s) as the user moves the electronic device back away from the physical object.

Although not shown in FIG. 24, in some examples, the electronic device provides similar feedback to the user as depicted in FIG. 24 if the field of view is too far away from the physical object (e.g., by displaying a textual message such as "Move Closer" and/or by changing a transparency of the center element and/or peripheral elements in accordance with the distance between the electronic device and the physical object).

In some examples, if the electronic device determines that the electronic device is moving faster than a threshold speed relative to the physical object, the electronic device provides graphical and/or textual feedback to the user indicating that the user should move the electronic device more slowly.

Optionally, the object capture process described with reference to FIGS. 10-24 is a first portion of an object capture process corresponding to capturing images of a physical object while the object is in a first orientation (e.g., upright, such as illustrated by pitcher 1004 in FIG. 10) with respect to the physical surface. In some examples, the image capture process optionally includes two or more portions (which may include repetitions or iterations) of the object identification and image capture processes that are each performed while the physical object is in different orientations with respect to the physical surface, to enable the electronic device to construct a more-accurate overall virtual representation of the physical object based on images captured while the physical object is in two or more different orientations.

In some examples, when the electronic device determines that the first image capture process is complete (e.g., after a threshold quantity of images has been captured at a threshold quantity of perspectives, after a first virtual representation of the physical object has been constructed, based on a user input corresponding to a request to terminate the first image capture process, and/or based on another criterion), the electronic device determines whether the physical object is "flippable"—e.g., whether the physical object can be flipped on its side (e.g., moved to a second orientation with respect to the physical surface) such that the electronic device can capture a second set of images of the physical object while it is in the second orientation. If the electronic device determines that the object is flippable (e.g., based on various heuristics associated with analyzing the physical object and/or the surface), optionally the electronic device displays a prompt that prompts the user to change the orientation of the physical object with respect to the surface.

Figure 25:
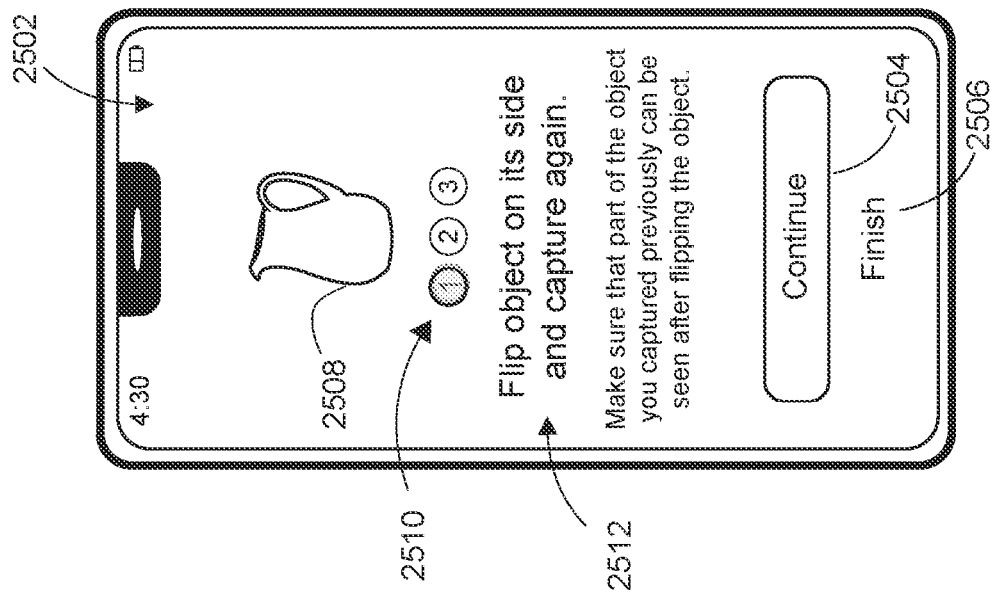

FIG. 25 depicts a prompt 2502 that the electronic device optionally displays after a first image capture process is complete. Prompt 2502 includes a textual message 2512 that prompts the user to change an orientation of the physical object, such as by flipping the physical object onto its side. Optionally, prompt 2508 includes a representation of the physical object (pitcher 1004 of FIG. 10) that was captured in the first image capture process. Optionally, prompt 2502 includes an indication 2510 of a quantity of different image capture processes that may be performed based on scanning the same physical object in different orientations. In the example of FIG. 25, prompt 2502 indicates that the electronic device can (optionally) perform three separate image capture processes while the physical object is placed in three respective orientations. Optionally, the indication 2510 indicates whether one or more of the image capture processes has been completed, such as by presenting separate indications corresponding to each image capture process and visually distinguishing the indication(s) corresponding to image capture process(es) that has been completed. For example, if the first image capture process has been completed, the indication 2510 may include visual highlighting associated with the first image capture process (shown in FIG. 25 as a darker circle around the "1").

Prompt 2502 includes a finish affordance 2506 that, when selected, causes the electronic device display the partial or complete virtual representation of the physical object and/or exit the image capture user interface (e.g., without performing a second image capture process).

Prompt 2502 includes a continue affordance 2504 that, when selected, causes the electronic device to initiate a second image capture process similar to that described with reference to FIGS. 10-24.

Figure 27:
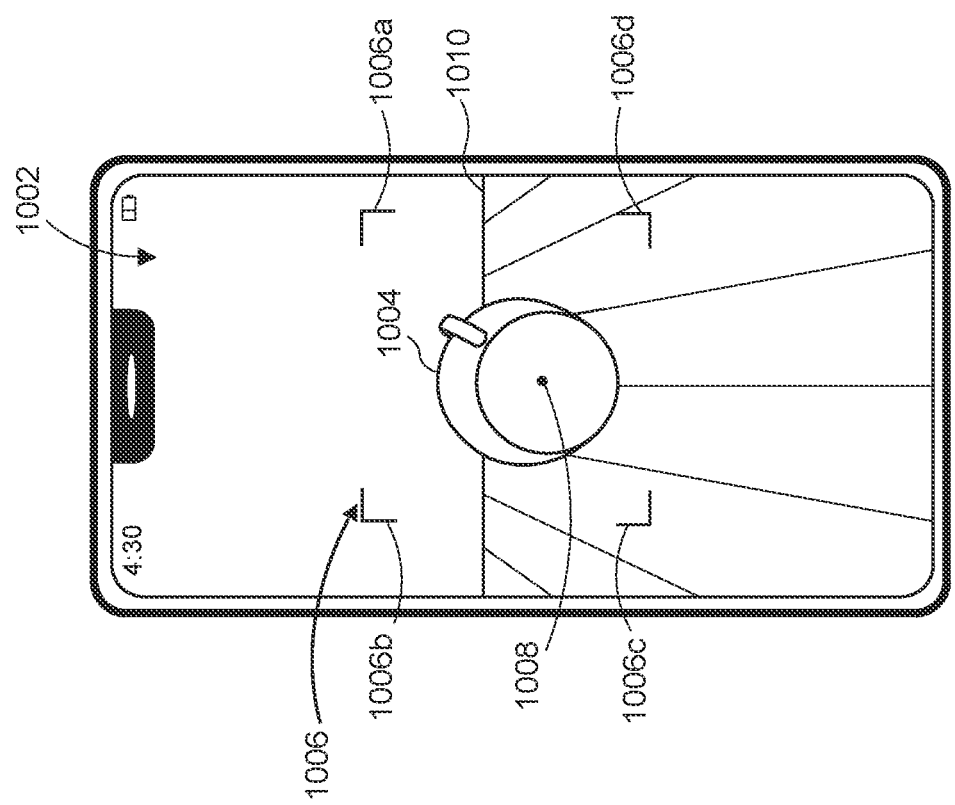
Figure 26:
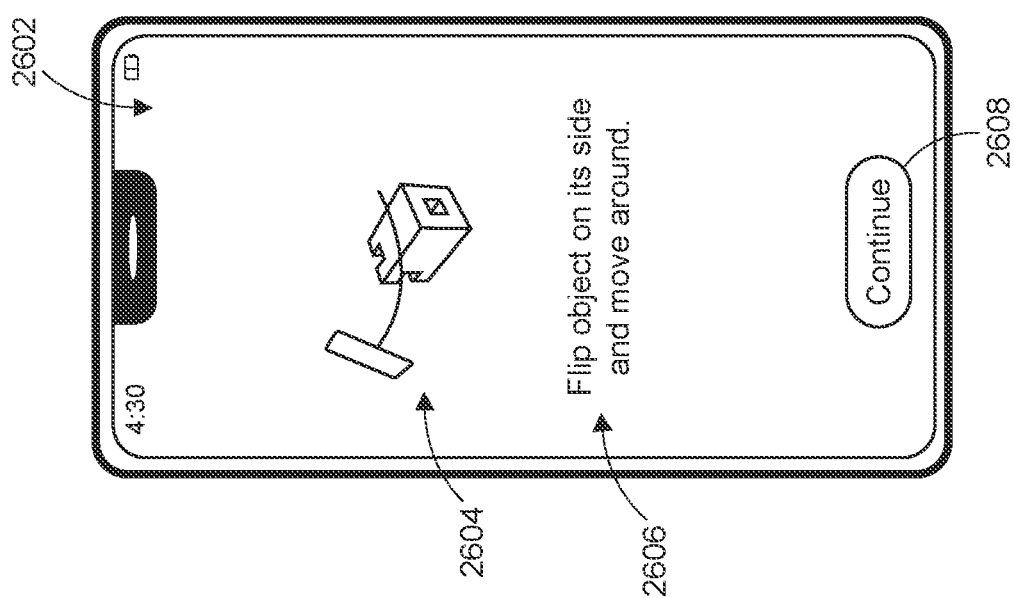

In some examples, in response to detecting a selection of continue affordance 2504 in FIG. 25, the electronic device displays another prompt 2602 shown in FIG. 26 that includes a textual message 2606 and/or graphical indication 2604 that prompts the user to change an orientation of the physical object to a desired orientation (e.g., a second orientation specified by the electronic device), such as by flipping the physical object onto its side and/or graphically illustrating the desired orientation of the physical object and the corresponding motion and position of the electronic device relative to the physical object. Optionally, prompt 2602 includes a continue affordance 2608 that, when selected, causes the electronic device to display a live view of the environment overlaid by a virtual reticle, as shown in FIG. 27. Optionally, the electronic device displays that live view and the virtual reticle in response to detecting motion of the electronic device, in response to detecting that a threshold amount of time has elapsed since prompt 2602 was displayed, or in response to another type of input.

Figure 28:
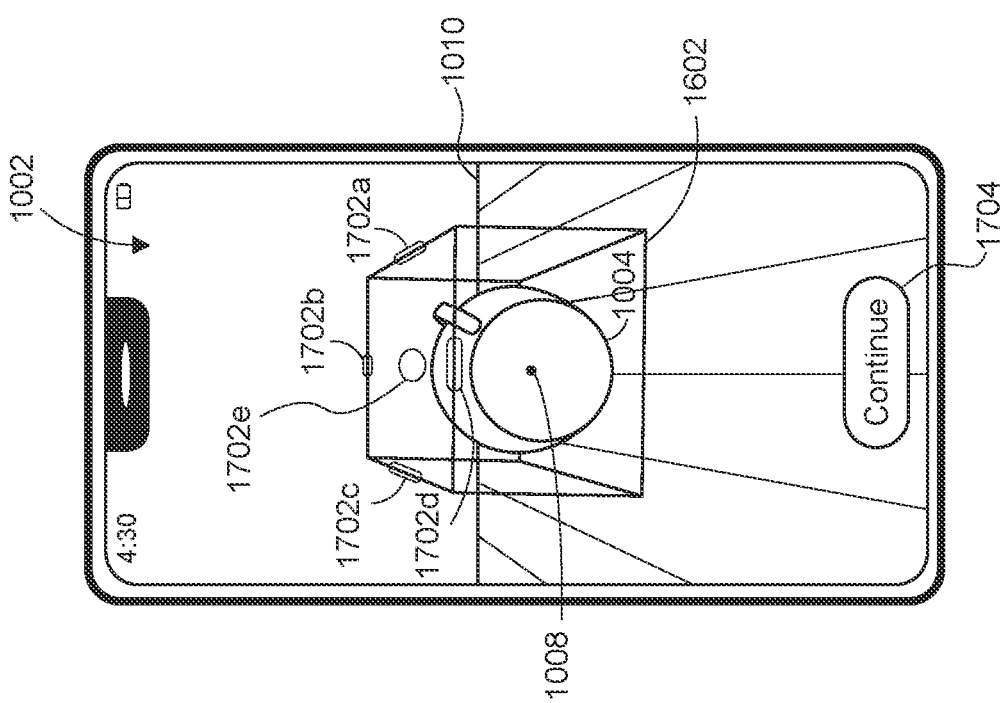

FIG. 27 depicts the same user interface 1002 as introduced in FIG. 10, but in this figure the pitcher 1004 has been placed (by the user) on its side, in a different orientation than in FIG. 10. The user interface elements shown in FIG. 27 correspond to those shown in FIG. 10, and the process for capturing images of the pitcher 1004 in the different orientation optionally proceeds as described with reference to FIGS. 10-20. For example, in response to detecting that the view of the pitcher 1004 is centered in the virtual reticle 1006, the electronic device optionally displays an animation that transforms the two-dimensional virtual reticle into a three-dimensional bounding shape, as shown in FIG. 28. In response to detecting a selection of continue affordance 1704 in FIG. 28, the electronic device displays capture user interface 1902 as shown in FIG. 29 (e.g., as introduced in FIG. 19) and, optionally, initiates capture of images of pitcher 1004.

Figure 29:
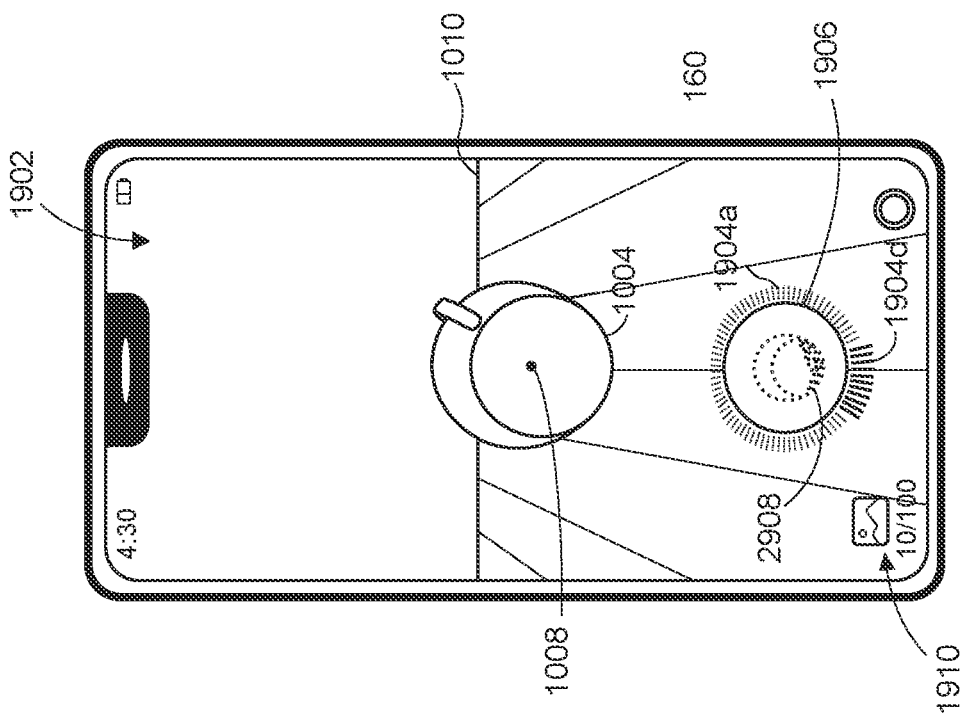

As shown in FIG. 29, during the second image capture process, the electronic device constructs a preview 2908 of a second virtual representation (e.g., a second point cloud representation) of the pitcher 1004 based on images captured of the pitcher 1004 while the pitcher 1004 is in the second orientation. Optionally, after completing the second image capture process (and, optionally, after completing additional image capture processes) the electronic device merges the images and/or the virtual representations generated by the different image capture processes to generate a composite virtual representation of the physical object, such as a point cloud representation or mesh representation.

Optionally, the electronic device displays, on the display, the composite virtual representation of the physical object.

Figure 30:
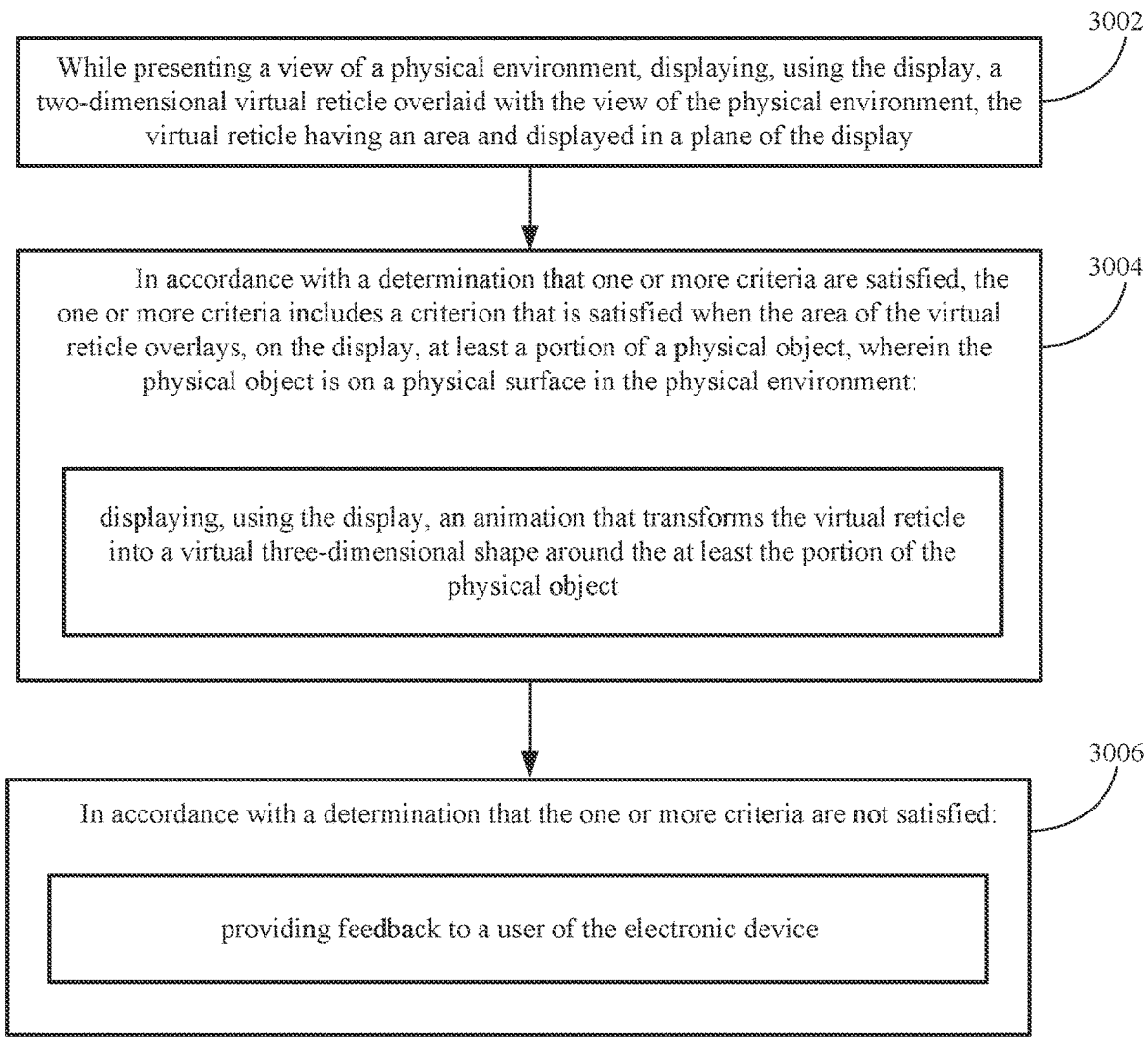
FIGS. 30-31 illustrate example flowcharts of generating a three-dimensional virtual representation of a physical object according to examples of the disclosure.
Figure 31:
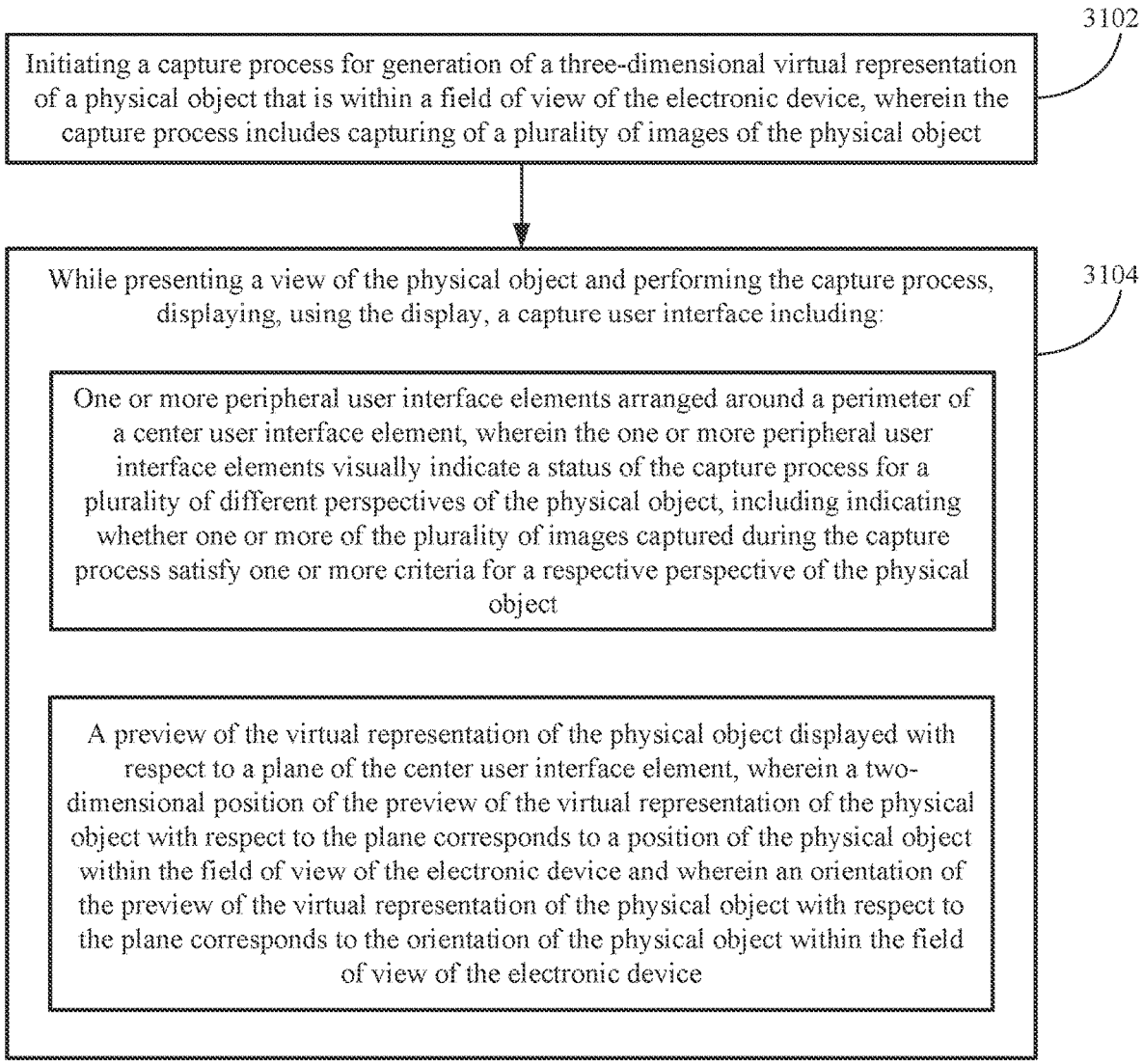

FIGS. 30-31 illustrate example flowcharts of processes for capturing images of a physical object captures according to examples of the disclosure. Process 3000 represents a process for identifying a physical object to capture, and process 3100 represents a process for capturing images of the identified physical object.

FIG. 30 depicts a process 3000 that may be performed by an electronic device (e.g., computer system 100, 101, and/or 200) in communication with (e.g., including and/or exchanging signals with) a display. At operation 3002, while presenting a view of a physical environment, the electronic device displays, using the display, a two-dimensional virtual reticle overlaid with the view of the physical environment. For example, the electronic device displays virtual reticle 1006 as shown in FIG. 10, which overlays a view of a physical environment that includes pitcher 1004 and surface 1010. The virtual reticle has an area (e.g., area 1006e) and is displayed in a plane of the display, such as shown in FIG. 10.

At operation 3004, in accordance with a determination that one or more criteria are satisfied, where the one or more criteria includes a criterion that is satisfied when the area of the virtual reticle overlays, on the display, at least a portion of a physical object (e.g., reticle 1006 overlays a portion of pitcher 1004 in FIG. 10), the electronic system displays, using the display, an animation that transforms the virtual reticle into a virtual three-dimensional shape around the at least the portion of the physical object, such as described with reference to FIGS. 13-17. In some examples, the one or more criteria include a criterion that is satisfied when the physical object is on a physical surface in the physical environment (e.g., pitcher 1004 is on surface 1010). In some examples, the one or more criteria includes a criterion that is satisfied when the physical object is entirely within the area of the virtual reticle, is centered in the virtual reticle, and/or has less than a threshold distance between an edge of the target physical device and the boundary of the rectangular area of the virtual reticle, such as described with reference to FIG. 12. In some examples, the one or more criteria include a criterion that is satisfied when a selection of a capture affordance is detected (e.g., capture affordance 1204 shown in FIG. 12).

Optionally, at operation 3006, in some examples, in accordance with a determination that the one or more criteria are not satisfied, the electronic device provides feedback to a user of the electronic device. For example, in response to determining that pitcher 1004 is not centered in virtual reticle 1006 and/or that a portion of pitcher 1004 is outside of virtual reticle 1006, the electronic device provides feedback to the user (e.g., textual message 1012, 1116 and/or vibration of virtual reticle 1006) as described with reference to FIGS. 10-11.

FIG. 31 depicts a process 3100 that may be performed by an electronic device (e.g., computer system 100, 101, and/or 200) in communication with (e.g., including and/or exchanging signals with) a display.

At operation 3102, the electronic device initiates a capture process for generation of a three-dimensional virtual representation of a physical object that is within a field of view of the electronic device, where the capture process includes capturing of a plurality of images of the physical object. For example, the electronic device initiates the capture process by beginning to automatically capture images of a physical object (e.g., pitcher 1004) as described with reference to FIGS. 18-19.

At operation 3104, while presenting a view of the physical object and performing the capture process, displaying, using the display, a capture user interface (e.g., user interface 1902 of FIG. 19) including one or more peripheral user interface elements (e.g., peripheral elements 1904*a-c*) arranged around a perimeter of a center user interface element (e.g., center element 1906), wherein the one or more peripheral user interface elements visually indicate a status of the capture process for a plurality of different perspectives of the physical object, including indicating whether one or more of the plurality of images captured during the capture process satisfy one or more criteria for a respective perspective of the physical object. For example, the elongated and darkened peripheral element 1904*b* of FIG. 19 indicates that one or more images satisfying one or more criteria (e.g., having sufficient image quality or other criteria) have been captured for a perspective corresponding to peripheral element 1904*b*.

The capture user interface includes a preview of the virtual representation of the physical object (e.g., preview 1908) displayed with respect to a plane of the center user interface element (e.g., displayed as resting on or above a plane of center element 1906), wherein a two-dimensional position of the preview of the virtual representation of the physical object with respect to the plane corresponds to a position of the physical object within the field of view of the electronic device and wherein an orientation of the preview of the virtual representation of the physical object with respect to the plane corresponds to the orientation of the physical object within the field of view of the electronic device. For example, preview 1908 is displayed as approximately centered on center element 1906, corresponding to pitcher 1004 being approximately centered in the field of view of the electronic device. For example, the orientation of preview 1908 (e.g., upright, resting on center element 1906) corresponds to the orientation of pitcher 1004 on surface 1010 (e.g., upright, resting on surface 1010).

Therefore, according to the above, some examples of the disclosure are directed to a method. The method can comprise at an electronic device in communication with a display and one or more input devices, displaying, using the display, a first representation of a three-dimensional object including a point cloud. While displaying the first representation, receiving an input requesting generation of a second representation of the three-dimensional object, the second representation including a three-dimensional mesh reconstruction of the three-dimensional object. In accordance with the input requesting the generation of the second representation, displaying a first visual indication of progress of the generation of the second representation of the three-dimensional object, wherein the first visual indication of the progress includes changing an appearance of the first representation corresponding to the progress. After generating the second representation, displaying the second representation of the three-dimensional object and ceasing displaying the first representation of three-dimensional object and the first visual indication of the progress.

Additionally or alternatively, in some examples, the method further comprises receiving, an input requesting generation of the point cloud from a plurality of images of the three-dimensional object from different perspectives. In accordance with the input requesting the generation of the point cloud, displaying a representation of a plurality of points, while displaying the plurality of points, displaying a second visual indication of progress of the generation of the point cloud different from the first visualization of progress, wherein the second visual indication of the progress includes changing an appearance of the plurality of points corresponding to the progress. After generating the point cloud, displaying the point cloud.

Additionally or alternatively, in some examples, the plurality of points has one or more characteristics of the plurality of images.

Additionally or alternatively, in some examples, a size and/or density of the displayed point cloud differs from a size and/or density of the plurality of points.

Additionally or alternatively, in some examples, the progress includes one or more of changing a position of the first representation corresponding to the progress, changing a size of the first representation corresponding to the progress, and changing a density of the plurality of points of the first representation corresponding to the progress.

Additionally or alternatively, in some examples, the method further comprises in accordance with the input requesting the generation of the point cloud, concurrently displaying a third visual indication of progress of the generation of the point cloud along with the second visual indication, wherein the third visual indication of progress is different from the first visualization of progress, and wherein the third visual indication of progress is a progress bar.

Additionally or alternatively, in some examples, the method further comprises in accordance with the input requesting the generation of the second representation, concurrently displaying a fourth visual indication of progress of the generation of the second representation of the three-dimensional object along with the first visual indication, wherein the fourth visual indication is different from the second visual indication of progress, and wherein the fourth visual indication of progress is a progress bar.

Additionally or alternatively, in some examples, the changing the appearance of the first representation corresponding to the progress comprises lightening a color of the first representation.

Additionally or alternatively, in some examples, the changing the appearance of the first representation corresponding to the progress comprises changing a percentage of the plurality of points to coincide with the percentage of progress.

Additionally or alternatively, in some examples, the method further comprises displaying, using the display, a user interface element on one or more of the plurality of images, receiving an input using the user interface element to update one or more characteristics of the one or more of the plurality of images, updating the one or more characteristics of the one or more of the plurality of images to generate an updated plurality of images, and generating the point cloud from updated plurality of images.

Additionally or alternatively, in some examples, the method further comprises receiving the first representation of the three-dimensional object including the point cloud from a capture bundle captured by a second electronic device different from the electronic device.

Additionally or alternatively, in some examples, the method further comprises displaying, using the display, a user interface element for receiving an input of a quality corresponding to the generation of the second representation of the three-dimensional object, and receiving the input of the quality corresponding to the generation of the second representation, wherein the second representation is generated at the quality in accordance with the input of the quality.

Additionally or alternatively, in some examples, the method further comprises while displaying the first representation, receiving an input to define a cropping region for the first representation, and generating the second representation based on the first representation within the cropping region.

Additionally or alternatively, in some examples, the point cloud is displayed in grey scale.

Additionally or alternatively, in some examples, the point cloud is displayed in color.

Additionally or alternatively, in some examples, the changing the appearance of the first representation corresponding to the progress comprises lightening the plurality of points as the progress increases.

Additionally or alternatively, in some examples, the changing the appearance of the first representation corresponding to the progress comprises changing the color of the plurality of points from greyscale to color as the progress increases.

Additionally or alternatively, in some examples, the method further comprises displaying, using the display, a user interface element for exporting the second representation of the three-dimensional object, receiving an input requesting an export of the second representation of the three-dimensional object using the user interface element for exporting the second representation of the three-dimensional object, and exporting the second representation of the three-dimensional object in accordance with the input requesting an export of the second representation of the three-dimensional object.

Additionally or alternatively, in some examples, the method further comprises displaying, using the display, a user interface element for storing or saving the second representation of the three-dimensional object, receiving an input requesting the one or more of a store or a save of the second representation of the three-dimensional object using the user interface element for storing or saving the second representation of the three-dimensional object, and storing or saving the second representation of the three-dimensional object in accordance with the input requesting the store or save of the second representation of the three-dimensional object.

According to the above, some examples of the disclosure are directed to a method. The method can include, at an electronic device in communication with a display, while presenting a view of a physical environment, displaying, using the display, a two-dimensional virtual reticle overlaid with the view of the physical environment, the virtual reticle having an area and displayed in a plane of the display. The method can include, in accordance with a determination that one or more criteria are satisfied, where the one or more criteria includes a criterion that is satisfied when the area of the virtual reticle overlays, on the display, at least a portion of a physical object that is within a threshold distance of a center of the virtual reticle, displaying, using the display, an animation that transforms the virtual reticle into a virtual three-dimensional shape around the at least the portion of the physical object.

Additionally or alternatively, in some examples, the method further comprises, in accordance with a determination that the one or more criteria are not satisfied, providing feedback to a user of the electronic device.

Additionally or alternatively, in some examples, the one or more criteria include a criterion that is satisfied when at least a portion of the physical object is overlaid by the center of the virtual reticle.

Additionally or alternatively, in some examples, the feedback includes a haptic alert, a visual alert, an audible alert, or a combination of these.

Additionally or alternatively, in some examples, the view of the physical environment is captured by a camera of the electronic device and displayed on the display of the electronic device.

Additionally or alternatively, in some examples, the virtual reticle includes one or more visual indications of the area of the virtual reticle.

Additionally or alternatively, in some examples, the visual indications of the area of the virtual reticle are visual indications of vertices of a virtual two-dimensional shape corresponding to the area of the virtual reticle.

Additionally or alternatively, in some examples, the visual indications of the area of the virtual reticle are visual indications of an outline of a virtual two-dimensional shape corresponding to the area of the virtual reticle.

Additionally or alternatively, in some examples, the two-dimensional reticle is screen-locked, and the method further comprises displaying a screen-locked targeting affordance in the center of the virtual two-dimensional reticle.

Additionally or alternatively, in some examples, displaying the animation includes: visually rotating an outline of a virtual two-dimensional shape corresponding to the area of the virtual reticle such that the outline appears to overlay the plane of a physical surface with which a bottom portion of the physical object is in contact, and encloses the bottom portion of the physical object, and adding height to the outline of the virtual two-dimensional shape to transition to displaying an outline of the virtual three-dimensional shape around the at least the portion of the physical object, wherein a height of the virtual three-dimensional shape is based on a height of the physical object.

Additionally or alternatively, in some examples, displaying the animation includes, before visually rotating the outline of the virtual two-dimensional shape, displaying an animation visually connecting the visual indications of the area of the two-dimensional virtual reticle to form the outline of the virtual two-dimensional shape.

Additionally or alternatively, in some examples, visually rotating the outline of the virtual two-dimensional shape includes resizing the outline of the virtual two-dimensional shape based on an area of a bottom portion of physical object.

Additionally or alternatively, in some examples, the virtual three-dimensional shape is a cuboid.

Additionally or alternatively, in some examples, one or more surfaces of the virtual three-dimensional shape are transparent such that the physical object is visible through the one or more surfaces of the virtual three-dimensional shape.

Additionally or alternatively, in some examples, displaying the outline of the virtual three-dimensional shape includes displaying lighting effects associated with the outline of the virtual three-dimensional shape.

Additionally or alternatively, in some examples, the outline of the virtual three-dimensional shape is automatically resized to enclose the physical object as the electronic device is moved around the physical object based on detecting that portions of the physical object are not enclosed by the virtual three-dimensional shape or that there is more than a threshold distance between an edge of the physical object and a surface of the virtual three-dimensional shape.

Additionally or alternatively, in some examples, the method includes displaying one or more virtual handle affordances on a top portion of the virtual three-dimensional shape; detecting an input corresponding to a request to move a first virtual handle affordance of the one or more virtual handle affordances; and in response to detecting the input, resizing the height, width, depth, or a combination of these of the virtual three-dimensional shape in accordance with the input.

Additionally or alternatively, in some examples, the method includes, in response to detecting the input, ceasing to automatically resize the virtual three-dimensional shape as the electronic device is moved around the physical object.

Additionally or alternatively, in some examples, the method includes detecting that user attention is directed to the first virtual handle affordance; and in response to detecting that the user attention is directed to the first virtual handle affordance, enlarging the first virtual handle affordance.

Additionally or alternatively, in some examples, the method includes increasing a visual prominence of a second virtual handle affordance on a bottom surface of the virtual three-dimensional shape in accordance with detecting that the electronic device is moving closer to an elevation of the bottom surface of the three-dimensional shape.

According to the above, some examples of the disclosure are directed to a method. The method can include, at an electronic device in communication with a display, initiating a capture process for generation of a three-dimensional virtual representation of a physical object that is within a field of view of the electronic device, wherein the capture process includes capturing of a plurality of images of the physical object; while presenting a view of the physical object and performing the capture process, displaying, using the display, a capture user interface comprising: one or more peripheral user interface elements arranged around a perimeter of a center user interface element, wherein the one or more peripheral user interface elements visually indicate a status of the capture process for a plurality of different perspectives of the physical object, including indicating whether one or more of the plurality of images captured during the capture process satisfy one or more criteria for a respective perspective of the physical object; and a preview of the virtual representation of the physical object displayed with respect to a plane of the center user interface element, wherein a two-dimensional position of the preview of the virtual representation of the physical object with respect to the plane corresponds to a position of the physical object within the field of view of the electronic device and wherein an orientation of the preview of the virtual representation of the physical object with respect to the plane corresponds to the orientation of the physical object within the field of view of the electronic device.

Additionally or alternatively, in some examples, the method includes changing a visual characteristic of a respective peripheral user interface element of the one or more peripheral user interface elements based on a quantity of images captured for a respective perspective of the electronic device relative to the physical object, the respective perspective corresponding to the respective peripheral user interface element.

Additionally or alternatively, in some examples, the method includes changing a perspective of the preview of the virtual representation of the physical object in accordance with a change in a perspective of the physical object in the field of view of the electronic device as the electronic device is moved around the physical object such that the perspective of the preview of the virtual representation mirrors the perspective of the physical object.

Additionally or alternatively, in some examples, the method includes moving the preview of the virtual representation of the physical object towards an edge of the center user interface element in accordance with a determination that the physical object is moving out of the field of view of the electronic device as the electronic device moves relative to the physical object.

Additionally or alternatively, in some examples, at least a portion of the capture user interface and at least a portion of the preview of the virtual representation of the physical object fade out in accordance with a determination that the physical object is moving out of the field of view of the electronic device as the electronic device moves relative to the physical object, wherein an amount of fading out corresponds to an amount of the physical object that is outside of the field of view of the electronic device.

Additionally or alternatively, in some examples, the method includes, in accordance with the determination that the physical object is moving out of the field of view of the electronic device, providing feedback to a user of the electronic device to aim the electronic device towards the physical object.

Additionally or alternatively, in some examples, the method includes, in accordance with a determination that the electronic device is moving faster than a threshold speed relative to the physical object, providing feedback to a user of the electronic device to move the electronic device more slowly.

Additionally or alternatively, in some examples, the capture user interface includes a screen-locked affordance in the plane of the display indicating an aiming direction of the electronic device.

Additionally or alternatively, in some examples, initiating the capture process includes automatically capturing a plurality of images of the physical object from a plurality of perspectives as the electronic device is moved around the physical object.

Additionally or alternatively, in some examples, the electronic device displays, in the capture user interface, a transient visual indication when each image of the plurality of images is captured.

Additionally or alternatively, in some examples, the preview of the virtual representation of the physical object is a preview of a point cloud representation that changes over time during the capture process as the point cloud representation is constructed.

Additionally or alternatively, in some examples, the method includes displaying an indication of a quantity of images captured out of a maximum quantity of images.

Additionally or alternatively, in some examples, the center user interface element is circular and the one or more peripheral user interface elements comprise a plurality of circumferential rays radiating from a threshold distance of a perimeter of the center user interface element, each ray corresponding to a respective perspective of the physical object.

Some examples of the disclosure are directed toward a computer readable storage medium. The computer readable storage medium can store one or more programs to perform any of the above methods. Some examples of the disclosure are directed toward an electronic device. The electronic device can comprise a display, memory, and one or more processors configured to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device, comprising:
a display;
memory; and
one or more processors configured to:
 initiate a capture process for generation of a three-dimensional virtual representation of a physical object that is within a field of view of the electronic device, wherein the capture process includes capturing of a plurality of images of the physical object;
 while presenting a view of the physical object and performing the capture process, display, using the display, a capture user interface comprising:
  one or more peripheral user interface elements arranged around a perimeter of a center user interface element, wherein the one or more peripheral user interface elements visually indicate a status of the capture process for a plurality of different perspectives of the physical object, including indicating whether one or more of the plurality of images captured during the capture process satisfy one or more criteria for a respective perspective of the physical object, and wherein the center user interface element is circular and the one or more peripheral user interface elements comprise a plurality of circumferential rays radiating from a threshold distance of a perimeter of the center user interface element, each ray corresponding to a respective perspective of the physical object; and
  a preview of the virtual representation of the physical object displayed with respect to a plane of the center user interface element, wherein a two-dimensional position of the preview of the virtual representation of the physical object with respect to the plane corresponds to a position of the physical object within the field of view of the electronic device and wherein an orientation of the preview of the virtual representation of the physical object with respect to the plane corresponds to the orientation of the physical object within the field of view of the electronic device.

2. The electronic device of claim 1, wherein at least a portion of the capture user interface and at least a portion of the preview of the virtual representation of the physical object fade out in accordance with a determination that the physical object is moving out of the field of view of the electronic device as the electronic device moves relative to the physical object, wherein an amount of fading out corresponds to an amount of the physical object that is outside of the field of view of the electronic device.

3. The electronic device of claim 2, wherein the one or more processors are further configured to:
in accordance with the determination that the physical object is moving out of the field of view of the electronic device, provide feedback to a user of the electronic device to aim the electronic device towards the physical object.

4. The electronic device of claim 1, wherein initiating the capture process includes automatically capturing a plurality of images of the physical object from a plurality of perspectives as the electronic device is moved around the physical object.

5. The electronic device of claim 4, wherein the electronic device is configured to display, in the capture user interface, a transient visual indication when each image of the plurality of images is captured.

6. The electronic device of claim 1, wherein the one or more processors are further configured to:
change a visual characteristic of a respective peripheral user interface element of the one or more peripheral user interface elements based on a quantity of images captured for a respective perspective of the electronic device relative to the physical object, the respective perspective corresponding to the respective peripheral user interface element.

7. The electronic device of claim 1, wherein the one or more processors are further configured to:
change a perspective of the preview of the virtual representation of the physical object in accordance with a change in a perspective of the physical object in the field of view of the electronic device as the electronic device is moved around the physical object such that the perspective of the preview of the virtual representation mirrors the perspective of the physical object.

8. The electronic device of claim 1, wherein the one or more processors are further configured to:
move the preview of the virtual representation of the physical object towards an edge of the center user interface element in accordance with a determination that the physical object is moving out of the field of view of the electronic device as the electronic device moves relative to the physical object.

9. The electronic device of claim 1, wherein the one or more processors are further configured to:
in accordance with a determination that the electronic device is moving faster than a threshold speed relative to the physical object, provide feedback to a user of the electronic device to move the electronic device more slowly.

10. The electronic device of claim 1, wherein the capture user interface includes a screen-locked affordance in the plane of the display indicating an aiming direction of the electronic device.

11. The electronic device of claim 1, wherein the one or more processors are further configured to:
display an indication of a quantity of images captured out of a maximum quantity of images.

12. The electronic device of claim 1, wherein the preview of the virtual representation of the physical object is a preview of a point cloud representation that changes over time during the capture process as the point cloud representation is constructed.

13. A method comprising:
at an electronic device in communication with a display:
initiating a capture process for generation of a three-dimensional virtual representation of a physical object that is within a field of view of the electronic device, wherein the capture process includes capturing of a plurality of images of the physical object;
while presenting a view of the physical object and performing the capture process, displaying, using the display, a capture user interface comprising:
one or more peripheral user interface elements arranged around a perimeter of a center user interface element, wherein the one or more peripheral user interface elements visually indicate a status of the capture process for a plurality of different perspectives of the physical object, including indicating whether one or more of the plurality of images captured during the capture process satisfy one or more criteria for a respective perspective of the physical object; and
a preview of the virtual representation of the physical object displayed with respect to a plane of the center user interface element, wherein a two-dimensional position of the preview of the virtual representation of the physical object with respect to the plane corresponds to a position of the physical object within the field of view of the electronic device and wherein an orientation of the preview of the virtual representation of the physical object with respect to the plane corresponds to the orientation of the physical object within the field of view of the electronic device, and wherein at least a portion of the capture user interface and at least a portion of the preview of the virtual representation of the physical object fade out in accordance with a determination that the physical object is moving out of the field of view of the electronic device as the electronic device moves relative to the physical object, wherein an amount of fading out corresponds to an amount of the physical object that is outside of the field of view of the electronic device.

14. The method of claim 1, wherein initiating the capture process includes automatically capturing a plurality of images of the physical object from a plurality of perspectives as the electronic device is moved around the physical object.

15. The method of claim 4, wherein the electronic device displays, in the capture user interface, a transient visual indication when each image of the plurality of images is captured.

16. The method of claim 1, further comprising:
changing a visual characteristic of a respective peripheral user interface element of the one or more peripheral user interface elements based on a quantity of images captured for a respective perspective of the electronic device relative to the physical object, the respective perspective corresponding to the respective peripheral user interface element.

17. The method of claim 1, further comprising:
changing a perspective of the preview of the virtual representation of the physical object in accordance with a change in a perspective of the physical object in the field of view of the electronic device as the electronic device is moved around the physical object such that the perspective of the preview of the virtual representation mirrors the perspective of the physical object.

18. The method of claim 1, further comprising:
moving the preview of the virtual representation of the physical object towards an edge of the center user interface element in accordance with a determination that the physical object is moving out of the field of view of the electronic device as the electronic device moves relative to the physical object.

19. The method of claim 13, further comprising:
in accordance with the determination that the physical object is moving out of the field of view of the electronic device, providing feedback to a user of the electronic device to aim the electronic device towards the physical object.

20. The method of claim 1, further comprising:
in accordance with a determination that the electronic device is moving faster than a threshold speed relative to the physical object, providing feedback to a user of the electronic device to move the electronic device more slowly.

21. The method of claim 1, wherein the capture user interface includes a screen-locked affordance in the plane of the display indicating an aiming direction of the electronic device.

22. The method of claim 1, wherein the preview of the virtual representation of the physical object is a preview of a point cloud representation that changes over time during the capture process as the point cloud representation is constructed.

23. The method of claim 1, wherein the center user interface element is circular and the one or more peripheral user interface elements comprise a plurality of circumferential rays radiating from a threshold distance of a perimeter of the center user interface element, each ray corresponding to a respective perspective of the physical object.

24. A non-transitory computer readable storage medium storing one or more programs, the one or more programs comprising instructions, which when executed by one or more processors of an electronic device, cause the electronic device to:
initiate a capture process for generation of a three-dimensional virtual representation of a physical object that is within a field of view of the electronic device, wherein initiating the capture process includes automatically capturing a plurality of images of the physical object from a plurality of perspectives as the electronic device is moved around the physical object;

while presenting a view of the physical object and performing the capture process, display, using the display, a capture user interface comprising:
  one or more peripheral user interface elements arranged around a perimeter of a center user interface element, wherein the one or more peripheral user interface elements visually indicate a status of the capture process for a plurality of different perspectives of the physical object, including indicating whether one or more of the plurality of images captured during the capture process satisfy one or more criteria for a respective perspective of the physical object; and
  a preview of the virtual representation of the physical object displayed with respect to a plane of the center user interface element, wherein a two-dimensional position of the preview of the virtual representation of the physical object with respect to the plane corresponds to a position of the physical object within the field of view of the electronic device and wherein an orientation of the preview of the virtual representation of the physical object with respect to the plane corresponds to the orientation of the physical object within the field of view of the electronic device.

25. The non-transitory computer readable storage medium of claim 24, wherein the instructions, when executed by one or more processors, cause the electronic device to:
  change a perspective of the preview of the virtual representation of the physical object in accordance with a change in a perspective of the physical object in the field of view of the electronic device as the electronic device is moved around the physical object such that the perspective of the preview of the virtual representation mirrors the perspective of the physical object.

26. The non-transitory computer readable storage medium of claim 24, wherein the instructions, when executed by one or more processors, cause the electronic device to:
  move the preview of the virtual representation of the physical object towards an edge of the center user interface element in accordance with a determination that the physical object is moving out of the field of view of the electronic device as the electronic device moves relative to the physical object.

27. The non-transitory computer readable storage medium of claim 24, wherein at least a portion of the capture user interface and at least a portion of the preview of the virtual representation of the physical object fade out in accordance with a determination that the physical object is moving out of the field of view of the electronic device as the electronic device moves relative to the physical object, wherein an amount of fading out corresponds to an amount of the physical object that is outside of the field of view of the electronic device.

28. The non-transitory computer readable storage medium of claim 24, wherein the preview of the virtual representation of the physical object is a preview of a point cloud representation that changes over time during the capture process as the point cloud representation is constructed.

29. The non-transitory computer readable storage medium of claim 24, wherein the instructions, when executed by one or more processors, cause the electronic device to display an indication of a quantity of images captured out of a maximum quantity of images.

30. The non-transitory computer readable storage medium of claim 24, wherein the center user interface element is circular and the one or more peripheral user interface elements comprise a plurality of circumferential rays radiating from a threshold distance of a perimeter of the center user interface element, each ray corresponding to a respective perspective of the physical object.

* * * * *